US012722427B2

(12) United States Patent
Sato

(10) Patent No.: US 12,722,427 B2
(45) Date of Patent: Sep. 1, 2026

(54) TIRE

(71) Applicant: The Yokohama Rubber Co., LTD., Tokyo (JP)

(72) Inventor: Shun Sato, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 84 days.

(21) Appl. No.: 17/227,776

(22) Filed: Apr. 12, 2021

(65) Prior Publication Data

US 2021/0339571 A1 Nov. 4, 2021

(30) Foreign Application Priority Data

Apr. 30, 2020 (JP) ................................ 2020-080849

(51) Int. Cl.
*B60C 11/13* (2006.01)
*B60C 11/03* (2006.01)

(52) U.S. Cl.
CPC ...... *B60C 11/1315* (2013.01); *B60C 11/0327* (2013.01); *B60C 2011/0346* (2013.01); *B60C 2011/0355* (2013.01); *B60C 2011/0365* (2013.01); *B60C 2011/0372* (2013.01)

(58) Field of Classification Search
CPC ................ B60C 11/0306; B60C 11/11; B60C 2011/0372; B60C 2011/0358; B60C 2011/0346; B60C 2011/0365; B60C 2200/06; B60C 11/1315; B60C 11/0327; B60C 2011/0355; B60C 2011/0374; B60C 11/042

See application file for complete search history.

(56) References Cited

U.S. PATENT DOCUMENTS 4,779,656 A * 10/1988 Graas .................. B60C 11/0302 152/DIG. 3
5,088,536 A * 2/1992 Graas .................. B60C 11/1369 152/902

(Continued)

FOREIGN PATENT DOCUMENTS

EP 0175829 A1 * 4/1986
EP 728599 A1 * 8/1996 ......... B60C 11/0309

(Continued)

OTHER PUBLICATIONS

Hasegawa, English Machine Translation of WO 2018/008732, 2018 (Year: 2018).*

*Primary Examiner* — Katelyn W Smith
*Assistant Examiner* — Brendon Charles Darby
(74) *Attorney, Agent, or Firm* — Thorpe North & Western, LLP

(57) ABSTRACT

A tire includes a tread portion that includes a center main groove, an outer main groove provided on an outer side in a tire width direction of the center main groove, and a lug groove extending in a direction intersecting with both main grooves. The center main groove has a zigzag shape in which a first linear portion and a second linear portion are alternately connected. The outer main groove has a zigzag shape in which a long linear portion and a short linear portion are alternately connected. The lug groove has a groove center line intersecting with the short linear portion in the zigzag shape of the outer main groove.

29 Claims, 24 Drawing Sheets

(56) References Cited

U.S. PATENT DOCUMENTS 5,135,038 A * 8/1992 Graas .................. B60C 11/1369 152/902
2003/0094227 A1* 5/2003 Bettiol .................... B60C 11/01 152/209.18
2007/0012389 A1* 1/2007 Ito .......................... B60C 11/047 152/209.22
2008/0121326 A1* 5/2008 Ohara ................... B60C 11/047 152/209.24
2012/0006456 A1* 1/2012 Koshio ................. B60C 11/125 152/209.18
2012/0111466 A1 5/2012 Takano
2012/0160384 A1* 6/2012 Amano ............... B60C 11/1315 152/209.18
2012/0216931 A1* 8/2012 Shiono .................... B60C 11/12 152/209.18
2016/0193883 A1* 7/2016 Kitani ................. B60C 11/0306 152/209.25
2017/0008349 A1* 1/2017 Tanaka .................. B60C 11/047
2017/0253088 A1* 9/2017 Maehara ............. B60C 11/0304
2018/0147893 A1* 5/2018 Kuriyama ........... B60C 11/1353
2019/0176533 A1 6/2019 Yasunaga
2019/0322140 A1* 10/2019 Nukushina ............. B60C 11/03

FOREIGN PATENT DOCUMENTS

JP H0293102 U 7/1990
JP H0825914 A 1/1996
JP 2012101572 A 5/2012
JP 6110838 B2 4/2017
JP 2019-104415 A 6/2019
WO WO-2018008732 A1 * 1/2018
WO WO-2018116512 A1 * 6/2018 ............. B60C 11/03

* cited by examiner

TIRE

CROSS-REFERENCE TO RELATED APPLICATIONS

This application claims priority pursuant to 35 U.S.C. 119(a) of Japan Patent Application No. 2020-080849, filed Apr. 30, 2020, which application is incorporated herein by reference in its entirety.

TECHNICAL FIELD

The present technology relates to a tire.

BACKGROUND ART

Of heavy duty tires, super low-aspect tires referred to as ultra wide-base tires are used for, for example, a garbage truck in some cases. For example, the garbage truck often performs stop-and-go operations in which acceleration and deceleration are repeatedly performed. Accordingly, when block-patterned super low-aspect tires considering drainage performance are employed for, for example, the garbage truck, heel and toe wear, in other words, uneven wear is easily generated. Meanwhile, the use of a rib pattern that allows ensuring rigidity in a tire circumferential direction to suppress heel and toe wear results in insufficient drainage performance and poor acceleration performance on wet road surfaces. Accordingly, the super low-aspect tire used for, for example, the garbage truck is desired to have the excellent acceleration performance on dry road surfaces and wet road surfaces.

Here, the improvement in acceleration performance on dry road surfaces can be achieved by increasing a ground contact area of the tire. Additionally, the improvement in acceleration performance on wet road surfaces can be achieved by increasing a groove area of the tire. Accordingly, the improvement in acceleration performance on dry road surfaces and the improvement in acceleration performance on wet road surfaces are in a negative correlation.

A heavy duty tire disclosed in Japan Patent No. 6110838 has lateral grooves curved in an S-shape. The heavy duty tire disclosed in Japan Patent No. 6110838 can exhibit high drainage performance and wear resistance performance.

However, the technology disclosed in Japan Patent No. 6110838 has room for improvement in improving uneven wear resistance performance while providing improved acceleration performance on dry road surfaces and improved acceleration performance on wet road surfaces in a compatible manner.

SUMMARY

The present technology provides a tire that allows improving uneven wear resistance performance while providing improved acceleration performance on dry road surfaces and improved acceleration performance on wet road surfaces in a compatible manner.

A tire includes a tread portion that includes a center main groove, an outer main groove provided on an outer side in a tire width direction of the center main groove, and a lug groove extending in a direction intersecting with both main grooves. The center main groove has a zigzag shape in which a first linear portion and a second linear portion are alternately connected. The outer main groove has a zigzag shape in which a long linear portion and a short linear portion are alternately connected. The lug groove has a groove center line intersecting with the short linear portion in the zigzag shape of the outer main groove. A ratio (LC1/PDc) of a length (LC1) of the first linear portion to a length (PDc) of one period of the zigzag shape of the center main groove is 0.40 or more and 0.60 or less. A ratio (Ls1/PDs, Ld1/PDd) of a length (Ls1, Ld1) of the long linear portion to a length (PDs, PDd) of one period of the zigzag shape of the outer main groove is 0.45 or more and 0.75 or less. A ratio (PDs/PDc) of the length of the one period of the zigzag shape of the outer main groove to the length of the one period of the zigzag shape of the center main groove is 0.90 or more and 1.20 or less.

In order to solve the problems described above and achieve the object, a tire according to an aspect of the present technology includes a tread portion. The tread portion includes a center main groove, an outer main groove, and a lug groove. The center main groove is provided at a position closest to a tire equatorial plane and extends in a tire circumferential direction. The outer main groove is provided on an outer side in a tire width direction of the center main groove and extends in the tire circumferential direction. The lug groove extends in a direction intersecting with the center main groove and the outer main groove. The center main groove has a zigzag shape in which a first linear portion and a second linear portion having mutually different inclination angles in the tire width direction with respect to the tire circumferential direction are alternately connected. The outer main groove has a zigzag shape in which a long linear portion and a short linear portion having mutually different inclination angles in the tire width direction with respect to the tire circumferential direction and having different tire circumferential direction lengths are alternately connected. An extension line as an extension of a groove center line of the lug groove intersects with the short linear portion in the zigzag shape of the outer main groove. A ratio of a tire circumferential length of the first linear portion to a tire circumferential length of one period of the zigzag shape of the center main groove is 0.40 or more and 0.60 or less. A ratio of the tire circumferential length of the long linear portion to a tire circumferential length of one period of the zigzag shape of the outer main groove is 0.45 or more and 0.75 or less. A ratio of the tire circumferential length of the one period of the zigzag shape of the outer main groove to the tire circumferential length of the one period of the zigzag shape of the center main groove is 0.90 or more and 1.20 or less.

The following is preferred. The period of the zigzag shape of the outer main groove has a phase difference with the period of the zigzag shape of the center main groove. When the center main groove is adjacent to the outer main groove in the tire width direction, a ratio of a tire circumferential length corresponding to the phase difference to the tire circumferential length of the one period of the zigzag shape of the center main groove is 0.60 or more and 0.85 or less.

The following is preferred. The tire includes a plurality of the outer main grooves. A ratio of a tire circumferential length corresponding to a phase difference between the period of the zigzag shape of the outer main groove on the outer side in the tire width direction among the plurality of outer main grooves and the period of the zigzag shape of the center main groove to the tire circumferential length of the one period of the zigzag shape of the center main groove is 0.95 or more and 1.15 or less.

The following is preferred. The tire includes a plurality of the lug grooves and a plurality of the outer main grooves. Each of the plurality of lug grooves extends from the tire equatorial plane to each of the plurality of outer main grooves. A plurality of center blocks are defined by the plurality of lug grooves and a plurality of the center main grooves. A plurality of outer blocks are defined by the plurality of lug grooves and the plurality of outer main grooves. Each of the plurality of lug grooves between the plurality of outer blocks adjacent in the tire circumferential direction has an inclination angle with respect to the tire circumferential direction greater than an inclination angle of each of the plurality of lug grooves between the plurality of center blocks adjacent in the tire circumferential direction with respect to the tire circumferential direction.

The following is preferred. The inclination angle of each of the plurality of lug grooves between the plurality of center blocks adjacent in the tire circumferential direction with respect to the tire circumferential direction is 20 degrees or more and 60 degrees or less.

The following is preferred. The inclination angle of each of the plurality of lug grooves between the plurality of outer blocks adjacent in the tire circumferential direction with respect to the tire circumferential direction is 60 degrees or more and 89 degrees or less.

The following is preferred. When each of the plurality of outer blocks is a first outer block adjacent to each of the plurality of center blocks on the outer side in the tire width direction, a ratio of a tire width direction length of the first outer block to a tire width direction length of each of the plurality of center blocks is 0.80 or more and 1.00 or less. When each of the plurality of outer blocks is a second outer block located on the outer side in the tire width direction of the first outer block, a ratio of a tire width direction length of the second outer block to the tire width direction length of each of the plurality of center blocks is 0.90 or more and 1.10 or less.

The following is preferred. The tire includes a plurality of the lug grooves and a plurality of the outer main grooves. Each of the plurality of lug grooves extends from the tire equatorial plane to each of the plurality of outer main grooves. A plurality of center blocks are defined by the plurality of lug grooves and a plurality of the center main grooves. A first outer block and a second outer block on the outer side in the tire width direction of the first outer block are defined by the plurality of lug grooves and the plurality of outer main grooves. A ratio of a tire circumferential length of the first outer block to a tire circumferential length of each of the plurality of center blocks is 0.75 or more and 1.00 or less. A ratio of a tire circumferential length of the second outer block to the tire circumferential length of each of the plurality of center blocks is 0.65 or more and 0.85 or less.

The following is preferred. The tire circumferential length of the long linear portion in the zigzag shape of each of the plurality of outer main grooves is longer than the tire circumferential length of the first linear portion. The tire circumferential length of the long linear portion in the zigzag shape of each of the plurality of outer main grooves is longer than the tire circumferential length of the second linear portion. The tire circumferential length of the short linear portion in the zigzag shape of each of the plurality of outer main grooves is shorter than the tire circumferential length of the first linear portion. The tire circumferential length of the short linear portion in the zigzag shape of each of the plurality of outer main grooves is shorter than the tire circumferential length of the second linear portion. The tire circumferential length of the short linear portion is 15 mm or more. The tire circumferential length of the long linear portion is 45 mm or less.

The following is preferred. A ratio of a distance in the tire circumferential direction between a plurality of outer blocks adjacent in the tire circumferential direction across the lug groove to a distance in the tire circumferential direction between a plurality of center blocks adjacent in the tire circumferential direction across the lug groove is 0.60 or more and 1.10 or less.

The following is preferred. Each of a plurality of the lug grooves extends from the tire equatorial plane to a plurality of the outer main grooves on both sides in the tire width direction across the tire equatorial plane. A ratio of a tire circumferential length between an opening position of each of the plurality of lug grooves to each of the plurality of outer main grooves on one side across the tire equatorial plane and an opening position of each of the plurality of lug grooves to each of the plurality of outer main grooves on the other side across the tire equatorial plane to a width of the tread portion is 0.30 or more and 0.60 or less.

The following is preferred. A ratio of an amplitude of the zigzag shape of each of the plurality of outer main grooves in the tire width direction to an amplitude of the zigzag shape of each of the plurality of center main grooves in the tire width direction is 1.15 or more and 1.50 or less.

The following is preferred. The tire includes a plurality of the lug grooves and a plurality of the outer main grooves. A ratio of an area of a road contact surface of each of a plurality of outer blocks defined by the plurality of lug grooves and the plurality of outer main grooves to an area of a road contact surface of each of a plurality of center blocks defined by the plurality of lug grooves and a plurality of the center main grooves is 0.85 or more and 1.05 or less.

The following is preferred. Each of a plurality of the lug grooves extends from the tire equatorial plane to a plurality of the outer main grooves on both sides in the tire width direction across the tire equatorial plane. An inflection point is provided between each of the plurality of outer main grooves on one side with respect to the tire equatorial plane and each of the plurality of outer main grooves on the other side with respect to the tire equatorial plane. A direction of a curvature in the tire circumferential direction from each of the plurality of outer main grooves on the one side to the inflection point and a direction of a curvature in the tire circumferential direction from each of the plurality of outer main grooves on the other side to the inflection point are opposite.

The following is preferred. The tire includes a plurality of the outer main grooves. The plurality of outer main grooves have shapes similar to one another.

The tire according to an embodiment of the present technology can improve uneven wear resistance performance while providing improved acceleration performance on dry road surfaces and improved acceleration performance on wet road surfaces in a compatible manner.

DETAILED DESCRIPTION

Embodiments of the present technology are described in detail below with reference to the drawings. In the embodiments described below, identical or substantially similar components to those of other embodiments have identical reference signs, and descriptions of those components are either simplified or omitted. The present technology is not limited by the embodiment. Constituents of the embodiments include elements that are essentially identical or that can be substituted or easily conceived by one skilled in the art. Note that it is possible to combine the configurations described below as desired. Moreover, various omissions, substitutions, and changes to the configurations can be carried out within the scope of the present technology.

Figure 1:
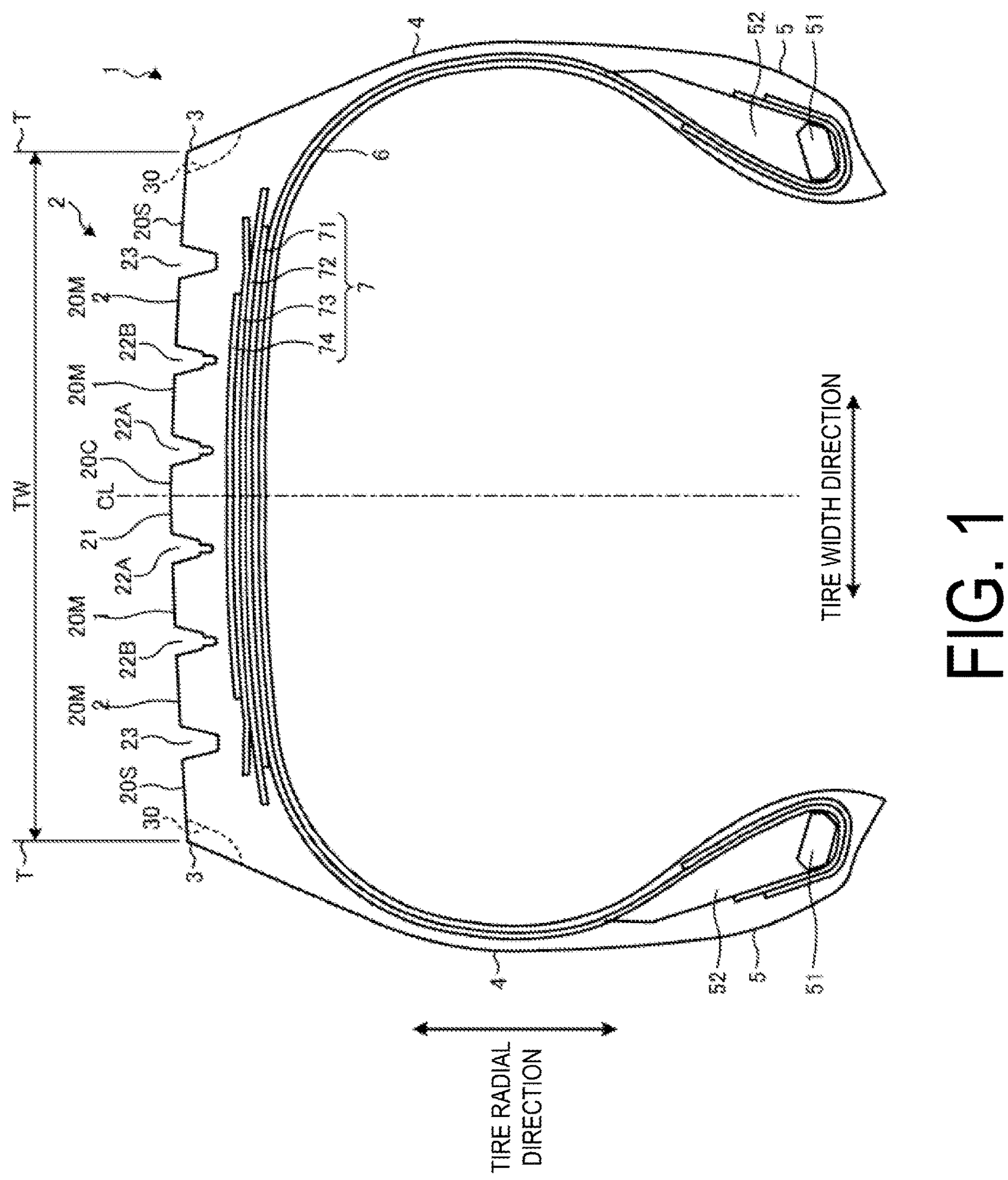
FIG. 1 is a meridian cross-sectional view of a tire according to an embodiment.
Figure 2:
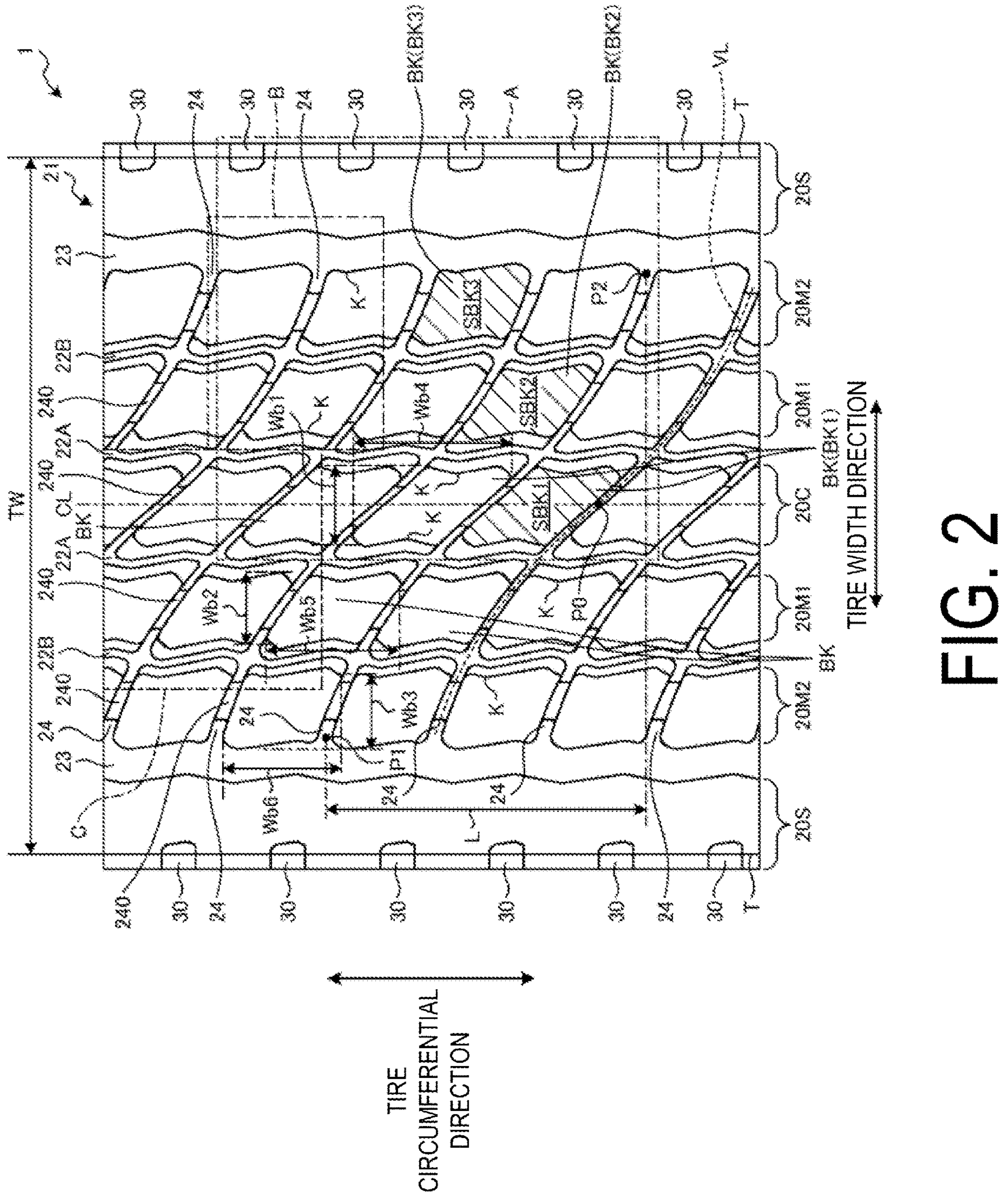
FIG. 2 is a plan view illustrating a tread surface of the tire according to the present embodiment.

FIG. 1 is a meridian cross-sectional view of a tire 1 according to the present embodiment. FIG. 2 is a plan view illustrating a tread surface of the tire 1 according to the present embodiment. The tire 1 according to the present embodiment is preferably a pneumatic tire. In addition to ordinary air or air with an adjusted oxygen partial pressure, inert gasses, such as nitrogen, argon, and helium, can be used as a gas with which the tire 1 is filled.

In the description below, the tire meridian cross-section is defined as a cross-section of the tire taken along a plane that includes a tire rotation axis (not illustrated). "Tire radial direction" refers to the direction orthogonal to the rotation axis (not illustrated) of the tire 1, the inner side in the tire radial direction refers to the side toward the tire rotation axis in the tire radial direction, and the outer side in the tire radial direction refers to the side away from the tire rotation axis in the tire radial direction. "Tire circumferential direction" refers to the circumferential direction with the tire rotation axis as the center axis. "Tire width direction" refers to the direction parallel with the tire rotation axis. "Inner side in the tire width direction" refers to the side toward a tire equatorial plane (tire equator line) CL in the tire width direction. "Outer side in the tire width direction" refers to the side away from the tire equatorial plane CL in the tire width direction. The tire equatorial plane CL is a plane that is orthogonal to the rotation axis of the tire 1 and passes through the center of the tire width of the tire 1. The position in the tire width direction of the tire equatorial plane CL matches the center line in the tire width direction, which is the center position of the tire 1 in the tire width direction. "Tire width" is the width in the tire width direction between portions located on the outermost in the tire width direction, or in other words, the distance between the portions that are the most distant from the tire equatorial plane CL in the tire width direction. "Tire equator line" refers to the line along the tire circumferential direction of the tire 1 that lies on the tire equatorial plane CL. In the present embodiment, the tire equator line and the tire equatorial plane are denoted by the identical reference sign CL.

As illustrated in FIG. 1, the tire 1 of the present embodiment includes a tread portion 2, shoulder portions 3 on both outer sides in the tire width direction of the tread portion 2, and sidewall portions 4 and bead portions 5 continuously formed in that order from the respective shoulder portions 3. Furthermore, the tire 1 includes a carcass layer 6 and a belt layer 7.

In FIG. 1, the shoulder portions 3 are portions of the tread portion 2 located on both outer sides in the tire width direction. Additionally, the sidewall portions 4 are exposed on the outermost sides of the tire 1 in the tire width direction. The bead portions 5 each include a bead core 51 and a bead filler 52. The bead core 51 is formed by winding a bead wire, which is a steel wire, into an annular shape. The bead filler 52 is a rubber material disposed in a space formed when an end portion in the tire width direction of the carcass layer 6 is folded back toward the outer side in the tire width direction at the position of the bead core 51.

The end portions of the carcass layer 6 in the tire width direction are folded back around the pair of bead cores 51 from an inner side to an outer side in the tire width direction, and the carcass layer 6 is stretched in a toroidal shape in the tire circumferential direction to form the framework of the tire. The carcass layer 6 is made of coating rubber-covered carcass cords (not illustrated) disposed side by side with an angle with respect to the tire circumferential direction along the tire meridian direction at an angle with respect to the tire circumferential direction. The carcass cords are made of steel or organic fibers (polyester, rayon, nylon, or the like).

The belt layer 7 has a multilayer structure in which four layers of belts 71, 72, 73, 74 are layered, for example, and in the tread portion 2, is disposed on the outer side in the tire radial direction, which is the outer circumference, of the carcass layer 6, covering the carcass layer 6 in the tire circumferential direction. The belts 71, 72, 73, 74 are made of coating rubber-covered cords (not illustrated) disposed side by side at a predetermined angle with respect to the tire circumferential direction. The cords are made of steel or organic fibers (polyester, rayon, nylon, or the like).

The tread portion 2 is made of a rubber material (tread rubber) and is exposed on the outermost side of the tire 1 in the tire radial direction, with the surface thereof constituting the contour of the tire 1. A tread surface 21 is formed on an outer circumferential surface of the tread portion 2, in other words, on a road contact surface that comes into contact with a road surface when running. A plurality (six in the present embodiment) of circumferential main grooves 22A, 22B, 23 that extend in the tire circumferential direction are provided in the tread surface 21. A plurality (seven in the present embodiment) of land portions 20C, 20M1, 20M2, 20S defined by the plurality of circumferential main grooves 22A, 22B, 23, extending in the tire circumferential direction, and arranged in the tire width direction are provided in the tread surface 21. Note that a length TW in the tire width direction between tire ground contact edges T is a tread width.

The circumferential main grooves 22A are circumferential main grooves provided at positions closest to the tire equator line CL. The circumferential main groove 22B is the circumferential main groove that is second closest to the tire equator line CL. The circumferential main grooves 22B are circumferential main grooves provided on the outer side of the circumferential main grooves 22A in the tire width direction. The circumferential main grooves 23 are circumferential main grooves provided on the outer side of the circumferential main grooves 22B in the tire width direction. The circumferential main grooves 23 are circumferential main grooves closest to the tire ground contact edges T. "Main groove" refers to a groove on which a wear indicator must be provided as specified by JATMA (The Japan Automobile Tyre Manufacturers Association, Inc.).

The land portion 20C is provided between the adjacent circumferential main grooves 22A, 22A across the tire equator line CL. The land portion 20C is defined by the two circumferential main grooves 22A, 22A. The land portion 20M1 is provided between the circumferential main groove 22A and the circumferential main groove 22B. The land portion 20M1 is defined by the circumferential main groove 22A and the circumferential main groove 22B. The land portion 20M2 is provided between the circumferential main groove 22B and the circumferential main groove 23. The land portion 20M2 is defined by the circumferential main groove 22B and the circumferential main groove 23. The land portions 20S are provided on the outer side of the circumferential main grooves 23 in the tire width direction. In the following description, the circumferential main groove is simply referred to as "main groove" in some cases. In the following description, the circumferential main groove 22A is referred to as a center main groove, and the circumferential main groove 22B and the circumferential main groove 23 are referred to as outer main grooves in some cases.

Tread Portion

The tread portion 2 will be described in detail below. In the following description, a groove depth is measured as the maximum value of a distance from the tread surface to the groove bottom when the tire is mounted on a specified rim, inflated to the specified internal pressure, and in an unloaded state. Additionally, in a configuration in which the grooves include an uneven portion or sipes on the groove bottom, the groove depth is measured excluding these portions.

As illustrated in FIG. 2, the tread portion 2 includes lug grooves 24. The lug grooves are lateral grooves extending in the tire width direction and opening when the tire comes into contact with the ground to function as grooves. The lug grooves 24 extend in a direction intersecting with the circumferential main grooves 22A, 22B, and a plurality of the lug grooves 24 are provided side by side in the tire circumferential direction. Each lug groove 24 extends from one circumferential main groove 23 to another circumferential main groove 23 in the tire width direction. Each lug groove 24 extends in the tire width direction from one circumferential main groove 23, penetrates the land portion 20M2, the land portion 20M1, the land portion 20C, the land portion 20M1, and the land portion 20M2, and opens to another circumferential main groove 23.

The lug grooves 24 extend from the tire equatorial plane CL to the circumferential main grooves 23 as the outer main grooves on both sides in the tire width direction across the tire equatorial plane CL. A tire circumferential length between a point P1, which is the opening position of the lug groove 24 to the circumferential main groove 23 on one side across the tire equatorial plane CL, and a point P2, which is the opening position of the lug groove 24 to the circumferential main groove 23 on the other side across the tire equatorial plane CL, in other words, the extension length of the lug groove 24 in the tire circumferential direction, is defined as a length L. A ratio L/TW of the length L to the tread width TW of the tread surface 21 is preferably 0.30 or more and 0.60 or less. When the ratio L/TW is less than 0.30, the strain of each block BK becomes excessive when a tire ground contact area is small, and dry performance is degraded, which is not preferred. When the ratio L/TW exceeds 0.60, the lug grooves 24 are divided when the tire ground contact area is small, and uneven wear resistance performance is degraded, which is not preferred. The ratio L/TW is more preferably 0.40 or more and 0.50 or less.

The land portion 20C includes the lug grooves 24 that connect to the circumferential main grooves 22A and the circumferential main grooves 22B to connect the circumferential main grooves 22A and the circumferential main grooves 22B. The land portions 20S are defined on the outer side in the tire width direction of the circumferential main grooves 23, and are disposed on the outermost side in the tire width direction of the tread portion 2. The land portion 20S includes lug grooves 30 on the edge portion on the outer side in the tire width direction. The lug grooves 30 are provided in the land portions 20S at a predetermined pitch in the tire circumferential direction. The end portion of the lug groove 30 on the side closer to the tire equatorial plane CL terminates in the land portion 205. The end portion of the lug groove 30 on the side farther from the tire equatorial plane CL extends beyond the tire ground contact edge T in the tire width direction and opens to the shoulder portion 3.

The tire ground contact edge T is defined as the maximum width position in the tire axial direction of the contact surface between the tire and a flat plate when the tire is mounted on a specified rim, inflated to the specified internal pressure, placed perpendicular to the flat plate in a static state without a load applied, and loaded with a load corresponding to the specified load.

"Specified rim" refers to a "standard rim" defined by JATMA, a "Design Rim" defined by TRA (The Tire and Rim Association, Inc.), or a "Measuring Rim" defined by ETRTO (The European Tyre and Rim Technical Organisation). Additionally, "specified internal pressure" refers to a "maximum air pressure" defined by JATMA, to the maximum value in "TIRE LOAD LIMITS AT VARIOUS COLD INFLATION PRESSURES" defined by TRA, or to "INFLATION PRESSURES" defined by ETRTO. Additionally, "specified load" refers to a "maximum load capacity" defined by JATMA, the maximum value in "TIRE LOAD LIMITS AT VARIOUS COLD INFLATION PRESSURES" defined by TRA, or "LOAD CAPACITY" defined by ETRTO.

As illustrated in FIG. 2, in this example, in the land portion 20C of the tread portion 2, a plurality of the blocks BK are defined by the circumferential main grooves 22A, 22B, 23 and the lug grooves 24 extending in the tire width direction. As illustrated in FIG. 2, the circumferential main grooves 22A, 22B, 23 have a zigzag shape with an amplitude in the tire width direction. In the following description, the block BK of the land portion 20C may be referred to as a block BK1, the block BK of the land portion 20M1 may be referred to as a block BK2, and the block BK of the land portion 20M2 may be referred to as a block BK3.

In the lug groove 24, a raised bottom portion 240 is provided between the blocks BK adjacent in the tire circumferential direction. The raised bottom portion 240 is a portion where the groove bottom is raised such that the groove depth becomes shallower than the other portion.

Blocks

The tread portion 2 includes the plurality of the blocks BK. The respective blocks BK are defined by the plurality of main grooves 22A, 22B, 23 and the plurality of lug grooves 24. Each block BK includes at least one bend point K. Thus, the block BK has a bent shape projecting to the inside of the block BK in plan view. Each block BK may include a plurality of the bend points K.

The blocks BK1 are center blocks defined by the two circumferential main grooves 22A provided on both sides across the tire equatorial plane CL and the plurality of lug grooves 24. The blocks BK2, BK3 are outer blocks provided on the outer side of the blocks BK1 in the tire width direction. The block BK2 is adjacent to the block BK1. The block BK3 is adjacent to the block BK2. The block BK3 is closer to the tire ground contact edge T than the block BK2.

Here, a ratio Wb2/Wb1 of a tire width direction length Wb2 of the block BK2 to a tire width direction length Wb1 of the block BK1 is preferably 0.80 or more and 1.00 or less. A ratio Wb3/Wb1 of a tire width direction length Wb3 of the block BK3 to the tire width direction length Wb1 of the block BK1 is preferably 0.90 or more and 1.10 or less. The ratio Wb2/Wb1 and the ratio Wb3/Wb1 falling within the value ranges described above approximately equalize the tire width direction lengths of the respective blocks, and uneven wear resistance performance is improved.

The block BK1 as the center block, the block BK2 as a first outer block adjacent to the block BK1 in the outer side in the tire width direction, and the block BK3 as a second outer block on the outer side in the tire width direction further have tire circumferential lengths preferably in the following relationships. In other words, a ratio Wb5/Wb4 of a tire circumferential length Wb5 of the block BK2 as the first outer block to a tire circumferential length Wb4 of the block BK1 as the center block is preferably 0.75 or more and 1.00 or less. A ratio Wb6/Wb4 of a tire circumferential length Wb6 of the block BK3 as the second outer block to the tire circumferential length Wb4 of the block BK1 as the center block is preferably 0.65 or more and 0.85 or less. The ratio Wb5/Wb4 and the ratio Wb6/Wb4 falling within the value ranges described above improve uneven wear resistance performance.

Here, an area of a road contact surface of one block BK1 is denoted as SBK1, an area of a road contact surface of one block BK2 provided on the outer side in the tire width direction of the block BK1 is denoted as SBK2, and an area of a road contact surface of one block BK3 provided on the outer side in the tire width direction of the block BK2 is denoted as SBK3. In this case, both of an area ratio SBK2/SBK1 and an area ratio SBK3/SBK1 are preferably 0.85 or more and 1.05 or less. The area ratios of the blocks falling within the value range described above allows providing dry performance and wet performance in a compatible manner.

The ratio SBK2/SBK1 and the ratio SBK3/SBK1 described above being less than 0.85 decreases the ground contact areas of the center blocks. This degrades dry performance, which is not preferred. The ratio SBK3/SBK1 and the ratio SBK3/SBK1 described above in excess of 1.05 degrades wet performance, which is not preferred. The ratio SBK2/SBK1 and the ratio SBK3/SBK1 described above are more preferably 0.90 or more and 1.00 or less.

Figure 3:
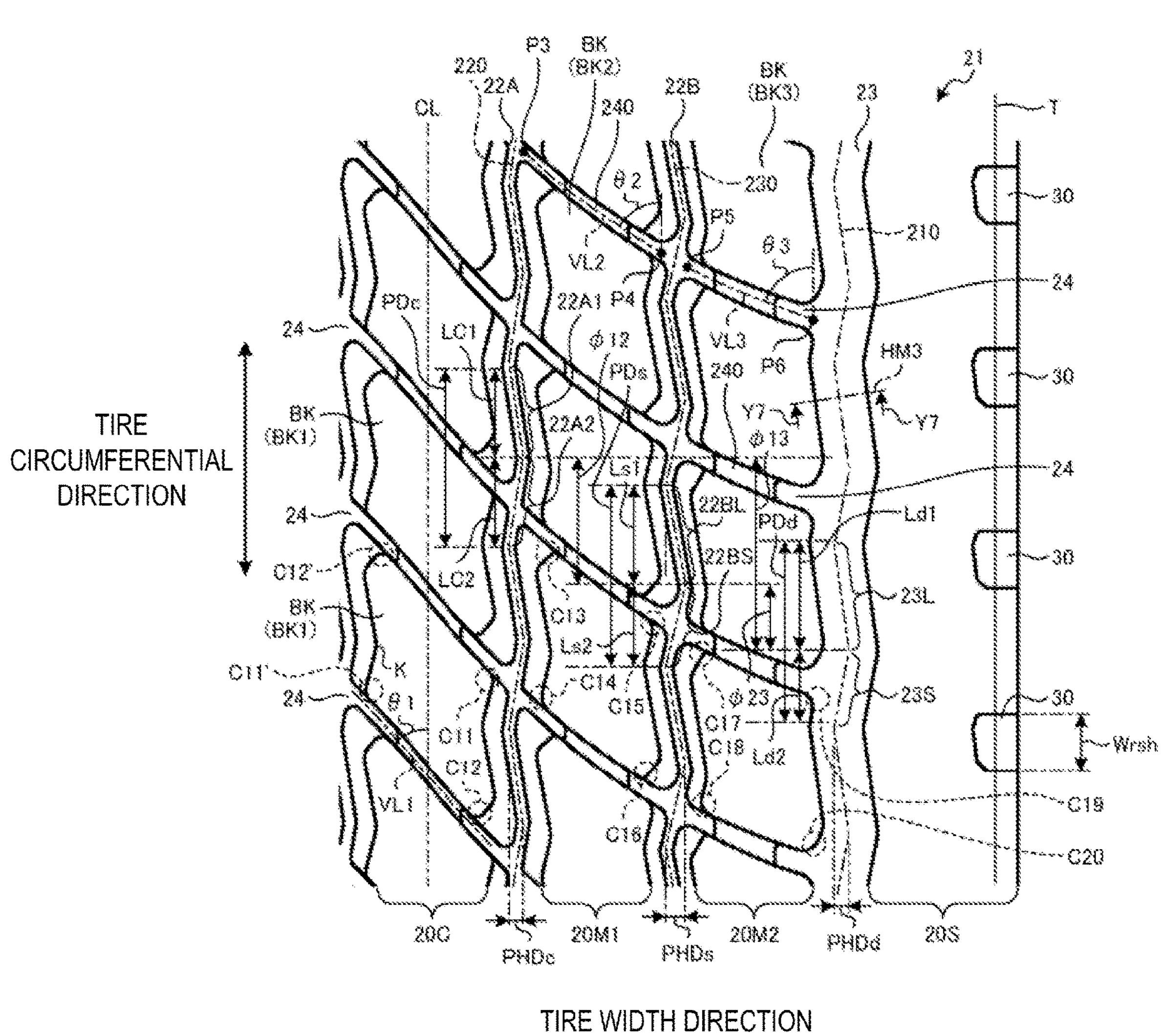
FIG. 3 is an enlarged view illustrating a part of FIG. 2.

FIG. 3 is an enlarged view illustrating a part of FIG. 2. FIG. 3 is an enlarged view illustrating a portion A in FIG. 2. FIG. 3 illustrates one side of the tread surface 21 around the tire equatorial plane CL. The structure of the tread surface 21 of the tire 1 of this example is point-symmetric about a point on the tire equatorial plane CL. Although the description may be given below focusing on one side of the tread surface 21, the other side of the tread surface 21 has the similar structure, and the descriptions thereof may be omitted.

As illustrated in FIG. 3, a groove center line 220 of the circumferential main groove 22A as the center main groove has a zigzag shape in which first linear portions 22A1 and second linear portions 22A2 are alternately connected. The first linear portion 22A1 and the second linear portion 22A2 differ from one another in an inclination angle in the tire width direction with respect to the tire circumferential direction. A tire circumferential length of the first linear portion 22A1 is denoted as LC1 and a tire circumferential length of the second linear portion 22A2 is denoted as LC2. A ratio LC1/PDc of the tire circumferential length LC1 of the first linear portion 22A1 to a tire circumferential length PDc of one period of the zigzag shape of the circumferential main groove 22A as the center main groove is preferably 0.40 or more and 0.60 or less. The ratio LC1/PDc being 0.40 or more and 0.60 or less means that the tire circumferential length LC1 and the tire circumferential length LC2 are substantially identical and the zigzag shapes of the circumferential main groove 22A are almost a single period. The zigzag shapes being almost the single period improves uneven wear resistance performance. When the ratio LC1/PDc is less than 0.40 or the ratio LC1/PDc exceeds 0.60, the zigzag shapes of the circumferential main groove 22A do not have the single period, but are close to periods of the zigzag shapes of the outer main groove. This degrades uneven wear resistance performance, which is not preferred.

A groove center line 230 of the circumferential main groove 22B as the outer main groove has a zigzag shape in which long linear portions 22BL and short linear portions 22BS are alternately connected. The long linear portion 22BL and the short linear portion 22BS differ from one another in an inclination angle in the tire width direction with respect to the tire circumferential direction. A tire circumferential length of the long linear portion 22BL and a tire circumferential length of the short linear portion 22BS differ from one another. The tire circumferential length of the long linear portion 22BL is denoted as Ls1, and the tire circumferential length of the short linear portion 22BS is denoted as Ls2. A ratio Ls1/PDs of the tire circumferential length Ls1 of the long linear portion 22BL to a tire circumferential length PDs of one period of the zigzag shape of the circumferential main groove 22B as the outer main groove is preferably 0.45 or more and 0.65 or less. When the ratio Ls1/PDs is less than 0.45 or the ratio Ls1/PDs exceeds 0.65, the period of the zigzag shape of the circumferential main groove 22B is close to the period of the zigzag shape of the circumferential main groove 22A as the center main groove. This degrades uneven wear resistance performance, which is not preferred.

Similarly, a groove center line 210 of the circumferential main groove 23 as the outer main groove has a zigzag shape in which long linear portions 23L and short linear portions 23S are alternately connected. The circumferential main groove 22B and the circumferential main groove 23 preferably have mutually similar shapes.

The long linear portion 23L and the short linear portion 23S differ from one another in an inclination angle in the tire width direction with respect to the tire circumferential direction. The long linear portion 23L and the short linear portion 23S differ in a tire circumferential length. The tire circumferential length of the long linear portion 23L is denoted as Ld1, and the tire circumferential length of the short linear portion 23S is denoted as Ld2. A ratio Ld1/PDd of the tire circumferential length Ld1 of the long linear portion 23L to the tire circumferential length PDd of one period of the zigzag shape of the circumferential main groove 23 as the outer main groove is preferably 0.45 or more and 0.65 or less. When the ratio Ld1/PDd is less than 0.45 or the ratio Ld1/PDd exceeds 0.65, the period of the zigzag shape of the circumferential main groove 23 is close to a period of the zigzag shape of the circumferential main groove 22A as the center main groove. This degrades uneven wear resistance performance, which is not preferred.

As long as the ratio LC1/PDc is 0.40 or more and 0.60 or less and the ratio Ls1/PDs and the ratio Ld1/PDd are 0.45 or more and 0.65 or less, the circumferential main grooves having the zigzag shapes of two kinds of periods can be provided in the tread surface 21. As a result, uneven wear resistance performance can be improved.

A ratio PDs/PDc of the tire circumferential length PDs of one period of the zigzag shape of the circumferential main groove 22B as the outer main groove to the tire circumferential length PDc of one period of the zigzag shape of the circumferential main groove 22A as the center main groove is preferably 0.90 or more and 1.20 or less. When the ratio PDs/PDc is less than 0.90 or the ratio PDs/PDc exceeds 1.20, the period of the zigzag shape of the center main groove greatly differs from the period of the zigzag shape of the outer main groove. This degrades uneven wear resistance performance, which is not preferred.

A ratio PDd/PDc of the tire circumferential length PDd of one period of the zigzag shape of the circumferential main groove 23 as the outer main groove to the tire circumferential length PDc of one period of the zigzag shape of the circumferential main groove 22A as the center main groove is preferably 0.90 or more and 1.10 or less. When the ratio PDd/PDc is less than 0.90 or the ratio PDd/PDc exceeds 1.10, the period of the zigzag shape of the center main groove greatly differs from the period of the zigzag shape of the outer main groove. This degrades uneven wear resistance performance, which is not preferred.

As illustrated in FIG. 3, there is a phase difference between the period of the zigzag shape of the circumferential main groove 22B as the outer main groove adjacent to the circumferential main groove 22A in the tire width direction and the period of the zigzag shape of the circumferential main groove 22A as the center main groove. A ratio φ12/PDc of a tire circumferential length φ12 corresponding to this phase difference to the tire circumferential length PDc of one period of the zigzag shape of the circumferential main groove 22A is preferably 0.60 or more and 0.85 or less. When the ratio φ12/PDc is less than 0.60, the phase difference is small and uneven wear resistance performance is degraded, which is not preferred. When the ratio φ12/PDc exceeds 0.85, the phase difference is large and uneven wear resistance performance is degraded, which is not preferred.

In addition, among the plurality of outer main grooves, there is a phase difference between the period of the zigzag shape of the circumferential main groove 23 as the outer main groove on the outer side in the tire width direction and the period of the zigzag shape of the circumferential main groove 22A as the center main groove. A ratio φ13/PDc of a tire circumferential length φ13 corresponding to this phase difference to the tire circumferential length PDc of one period of the zigzag shape of the circumferential main groove 22A is preferably 0.95 or more and 1.15 or less. When the ratio φ13/PDc is less than 0.95, the phase difference is small and uneven wear resistance performance is degraded, which is not preferred. When the ratio φ13/PDc exceeds 1.15, the phase difference is large and uneven wear resistance performance is degraded, which is not preferred.

Note that there is a phase difference between the period of the zigzag shape of the circumferential main groove 22B as the outer main groove and the period of the zigzag shape of the circumferential main groove 23 as the outer main groove. A tire circumferential length corresponding to this phase difference is φ23.

In FIG. 3, the tire circumferential length Ls1 of the long linear portion 22BL in the zigzag shape of the circumferential main groove 22B as the outer main groove is longer than the tire circumferential length LC1 of the first linear portion 22A1. The tire circumferential length Ls1 of the long linear portion 22BL in the zigzag shape of the circumferential main groove 22B as the outer main groove is longer than the tire circumferential length LC2 of the second linear portion 22A2. The tire circumferential length Ls2 of the short linear portion 22BS in the zigzag shape of the circumferential main groove 22B as the outer main groove is shorter than the tire circumferential length LC1 of the first linear portion 22A1. The tire circumferential length Ls2 of the short linear portion 22BS in the zigzag shape of the circumferential main groove 22B as the outer main groove is shorter than the tire circumferential length LC2 of the second linear portion 22A2.

The tire circumferential length of the short linear portion 22BS is preferably 15 mm or more. The tire circumferential length of the long linear portion 22BL is preferably 45 or less. When the tire circumferential length of the short linear portion 22BS is less than 15 mm, a deviation from the tire circumferential length of the long linear portion 22BL is large. This degrades uneven wear resistance performance, which is not preferred. When the tire circumferential length of the long linear portion 22BL exceeds 45 mm, a deviation from the tire circumferential length of the short linear portion 22BS is large. This degrades uneven wear resistance performance, which is not preferred. Note that the tire circumferential length of the short linear portion 22BS is more preferably 20 mm or more. The tire circumferential length of the long linear portion 22BL is more preferably 40 mm or less.

Here, an amount of displacement in the tire width direction (tire width direction length) of the zigzag shape of the circumferential main groove 22A is defined as an amplitude PHDc. An amount of displacement in the tire width direction (tire width direction length) of the zigzag shape of the circumferential main groove 22B is defined as an amplitude PHDs. An amount of displacement in the tire width direction (tire width direction length) of the zigzag shape of the circumferential main groove 23 is defined as an amplitude PHDd. A ratio PHDs/PHDc of the amplitude PHDs to the amplitude PHDc is preferably 1.15 or more and 1.50 or less. When the ratio PHDs/PHDc is less than 1.15, the area of the blocks BK constituting the center land portion 20C is insufficient. This degrades dry performance, which is not preferred. When the ratio PHDs/PHDc exceeds 1.50, due to uneven shoulder land portions, uneven wear resistance performance is degraded, which is not preferred. Note that the ratio PHDs/PHDc is more preferably 1.25 or more and 1.40 or less.

A ratio PHDd/PHDc of the amplitude PHDd to the amplitude PHDc is preferably 0.90 or more and 1.20 or less. When the ratio PHDd/PHDc is less than 0.90, the area of the blocks BK constituting the center land portion 20C is insufficient. This degrades dry performance, which is not preferred. When the ratio PHDs/PHDc exceeds 1.20, due to uneven shoulder land portions, uneven wear resistance performance is degraded, which is not preferred. Note that the ratio PHDd/PHDc is more preferably 0.95 or more and 1.15 or less.

Inclination Angle of Lug Groove

As illustrated in FIG. 3, the lug grooves 24 extend inclined with respect to the tire circumferential direction. Preferably, the inclination angles of the lug grooves 24 with respect to the tire circumferential direction are smaller as the lug groove 24 is close to the tire equatorial plane CL and larger as the lug groove 24 is far from the tire equatorial plane CL. The angle between the lug groove 24 and the tire equatorial plane CL being close to 90 degrees at the position close to the tire equatorial plane CL degrades uneven wear resistance performance, which is not preferred. The angle between the lug groove 24 and the tire equatorial plane CL being close to 0 degrees at the position away from the tire equatorial plane CL degrades uneven wear resistance performance, which is not preferred.

In other words, the inclination angle of the lug groove 24 with respect to the tire circumferential direction between the plurality of blocks BK2 adjacent in the tire circumferential direction is greater than the inclination angle of the lug groove 24 with respect to the tire circumferential direction between the plurality of blocks BK1 adjacent in the tire circumferential direction. Also, the inclination angle of the lug groove 24 with respect to the tire circumferential direction between the plurality of blocks BK3 adjacent in the tire circumferential direction is greater than the inclination angle of the lug groove 24 with respect to the tire circumferential direction between the plurality of blocks BK1 adjacent in the tire circumferential direction.

An inclination angle θ1 of the lug groove 24 with respect to the tire circumferential direction between the blocks BK1 as the center blocks is preferably 20 degrees or more and 60 degrees or less. The inclination angle θ1 is an angle formed between an imaginary line VL1 and the tire circumferential direction. The imaginary line VL1 is a straight line connecting midpoints of opening positions of the lug groove 24 to the circumferential main grooves 22A between the blocks BK1. The inclination angle θ1 being less than 20 degrees degrades scratch resistance performance of the block BK1 (in other words, increases a possibility of a lack of a part of the block BK1), which is not preferred. The inclination angle θ1 in excess of 60 degrees degrades dry performance, which is not preferred. The inclination angle θ1 is more preferably 30 degrees or more and 50 degrees or less.

An inclination angle θ2 of the lug groove 24 with respect to the tire circumferential direction between the blocks BK2 as the outer blocks adjacent to the block BK1 is preferably 60 degrees or more and 85 degrees or lesss. The inclination angle θ2 is an angle formed between an imaginary line VL2 and the tire circumferential direction. The imaginary line VL2 is a straight line connecting a midpoint P3 of an opening position of the lug groove 24 to the circumferential main groove 22A and a midpoint P4 of an opening position of the lug groove 24 to the circumferential main groove 22B between the blocks BK2. The inclination angle θ2 being less than 60 degrees degrades uneven wear resistance performance, which is not preferred. The inclination angle θ2 in excess of 85 degrees degrades dry performance due to uneven block rigidity, which is not preferred. The inclination angle θ2 is more preferably 65 degrees or more and 80 degrees or less.

An inclination angle θ3 of the lug groove 24 with respect to the tire circumferential direction between the blocks BK3 as the outer blocks close to the tire ground contact edge T is preferably 60 degrees or more and 89 degrees or less. The inclination angle θ3 is an angle formed between an imaginary line VL3 and the tire circumferential direction. The imaginary line VL3 is a straight line connecting a midpoint P5 of an opening position of the lug grooves 24 to the circumferential main grooves 22B and a midpoint P6 of an opening position of the lug grooves 24 to the circumferential main groove 23 between the blocks BK3. The inclination angle θ3 being less than 60 degrees degrades uneven wear resistance performance, which is not preferred. The inclination angle θ3 in excess of 89 degrees degrades dry performance due to uneven block rigidity, which is not preferred. The inclination angle θ3 is more preferably 65 degrees or more and 85 degrees or less.

Intersection Position of Lug Groove

Figure 4:
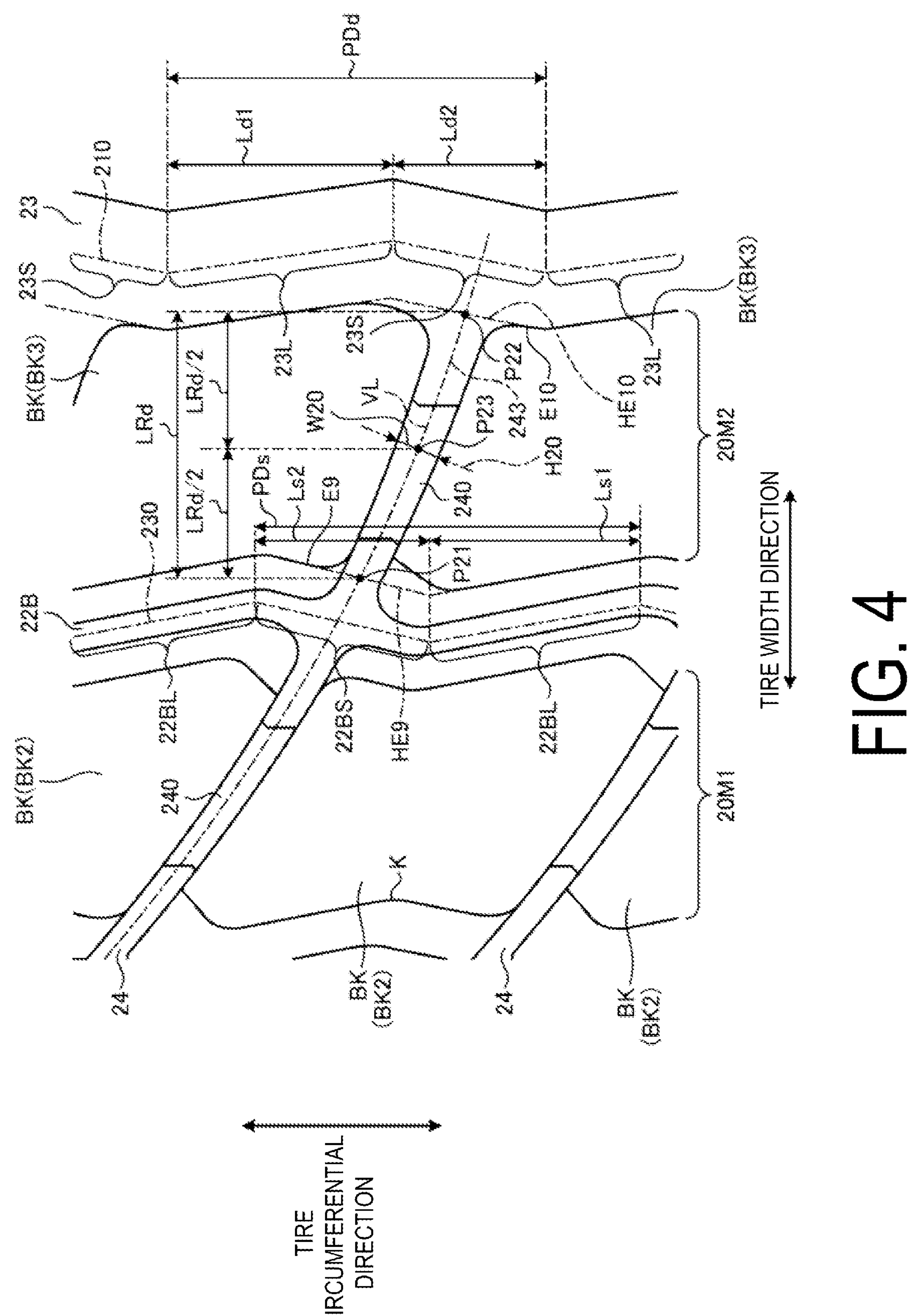
FIG. 4 is a diagram illustrating intersection positions between lug grooves and circumferential main grooves.

FIG. 4 is an enlarged view illustrating a part of FIG. 2. FIG. 4 is an enlarged view illustrating a portion B in FIG. 2. FIG. 4 is a diagram illustrating intersection positions of the lug groove 24, the circumferential main groove 22B, and the circumferential main groove 23. In FIG. 4, an imaginary line VL is an extension line of the extension of the groove center line of the lug groove 24. The imaginary line VL intersects with the short linear portion 22BS in the zigzag shape of the circumferential main groove 22B as the outer main groove. Furthermore, the imaginary line VL intersects with the short linear portion 23S in the zigzag shape of the circumferential main groove 23 as the outer main groove.

In this way, since the imaginary line VL intersects with the short linear portion 22BS, not the long linear portion 22BL, the long linear portion 22BL is located on the side surface of the block BK2 in the tire width direction. Since the long linear portion 22BL is located on the side surface of the block BK2 in the tire width direction, the area of the road contact surface of the block BK2 can be ensured. As a result, dry performance and uneven wear resistance performance are improved.

Similarly, since the imaginary line VL intersects with the short linear portion 23S, not the long linear portion 23L, the long linear portion 23L is located on the side surface of the block BK3 in the tire width direction. Since the long linear portion 23L is located on the side surface of the block BK3 in the tire width direction, the area of the road contact surface of the block BK3 can be ensured. As a result, dry performance and uneven wear resistance performance are improved.

Shape of Lug Groove

Furthermore, as illustrated in FIG. 2, the imaginary line VL has an S-shape. In other words, the lug groove 24 has the S-shape in plan view. The imaginary line VL extends from the tire equatorial plane CL to the circumferential main grooves 23 as the outer main grooves on both sides in the tire width direction across the tire equatorial plane CL. An inflection point P0 is provided between the circumferential main groove 23 on one side of the tire equatorial plane CL and the circumferential main groove 23 on the other side of the tire equatorial plane CL. In the present example, the point where the lug groove 24 intersects with the tire equatorial plane CL is the inflection point P0 of the imaginary line VL. A direction of a curvature in the tire circumferential direction from the circumferential main groove 23 on one side to the inflection point P0 and a direction of a curvature in the tire circumferential direction from the circumferential main groove 23 on the other side to the inflection point P0 are opposite to one another. Thus, the lug grooves 24 having the S-shape allows improving dry performance, wet performance, and uneven wear resistance performance.

However, the inflection point P0 on the imaginary line VL may be at a position other than the position intersecting with the tire equatorial plane CL. Even when the inflection point P0 is at the position other than the position intersecting with the tire equatorial plane CL, the lug grooves 24 having the S-shape allow improving dry performance, wet performance, and uneven wear resistance performance.

Cross-Sectional Shape of Main Groove

Figure 5:
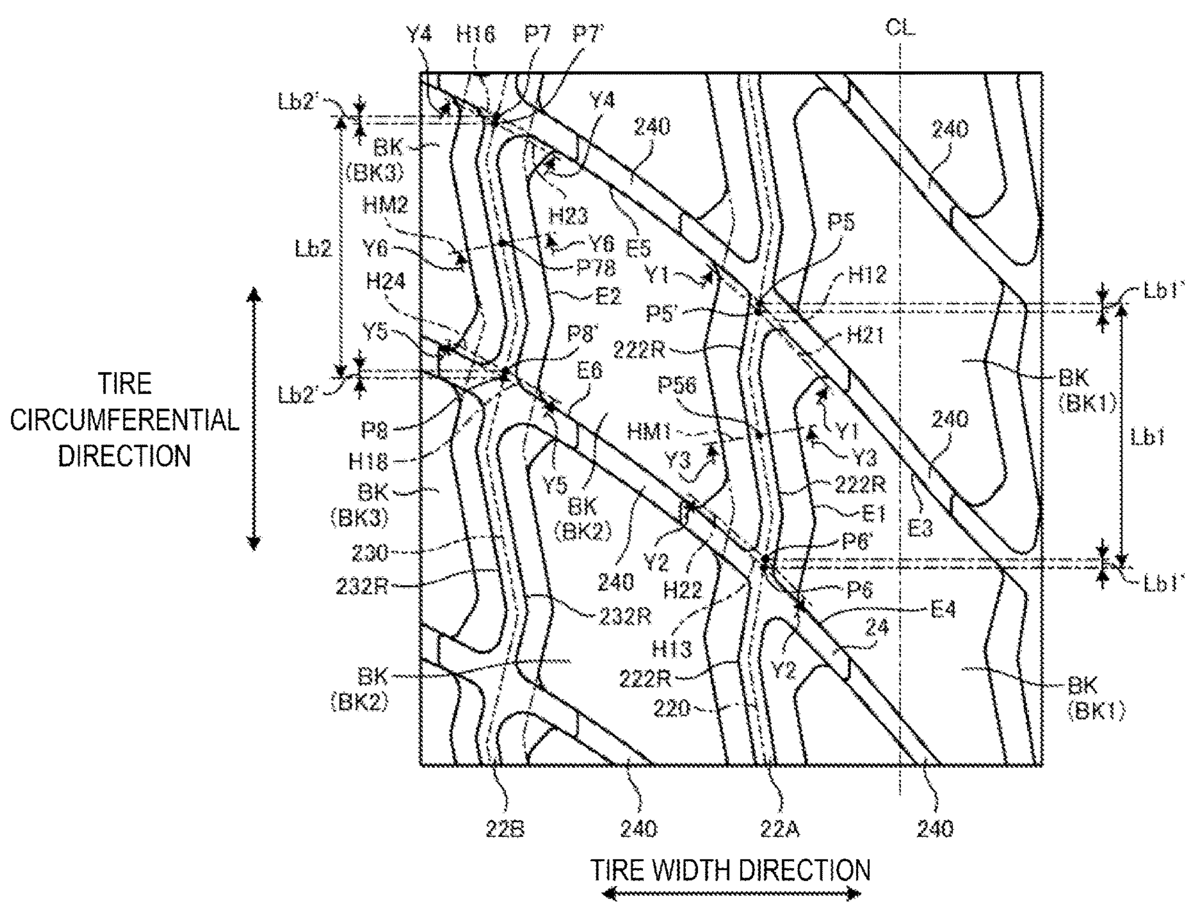
FIG. 5 is a diagram illustrating an example of a structure of main grooves.
Figure 6:
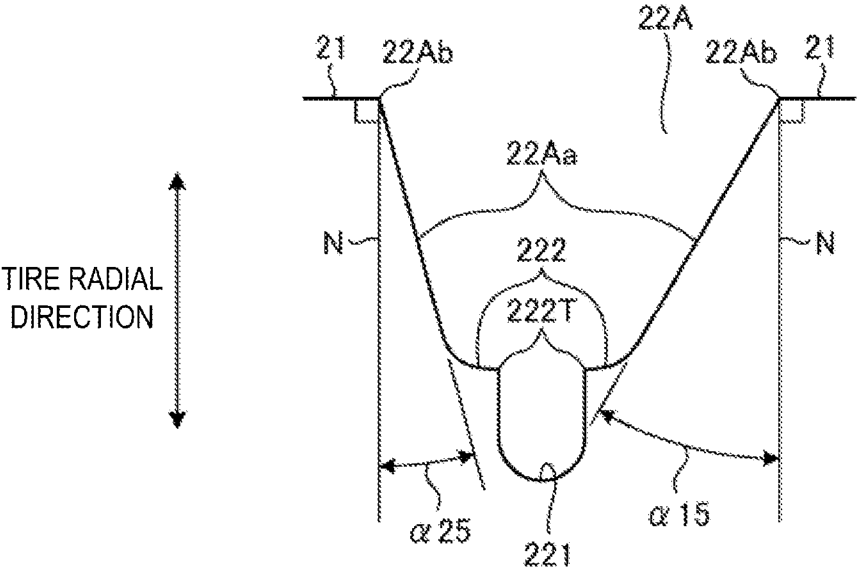
FIG. 6 is a diagram illustrating an example of the structure of the main groove.
Figure 7:
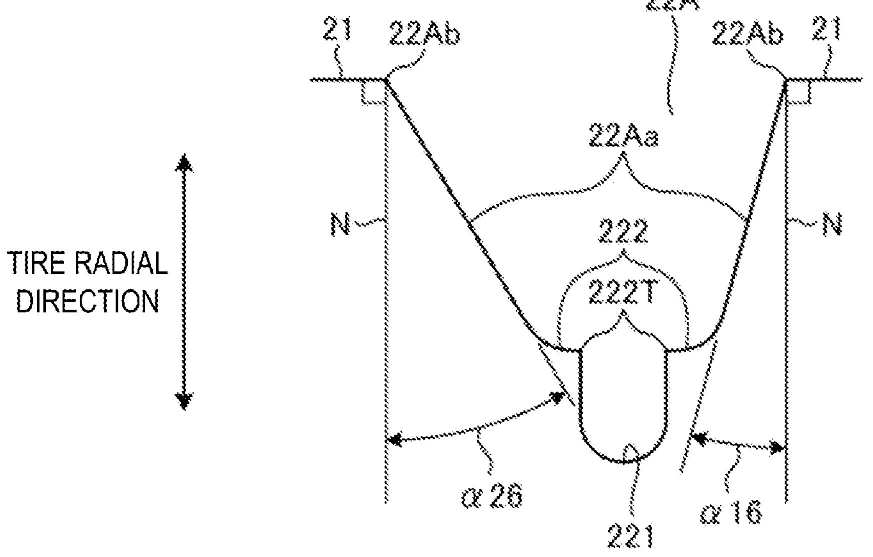
FIG. 7 is a diagram illustrating an example of the structure of the main groove.
Figure 8:
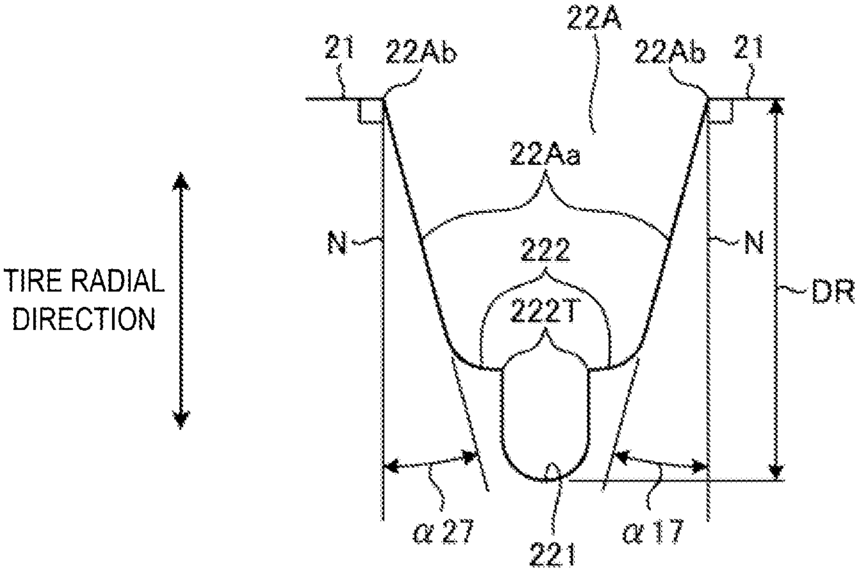
FIG. 8 is a diagram illustrating an example of the structure of the main groove.

An example of the cross-sectional shape of the main groove will be described with reference to FIGS. 5 to 12. FIGS. 5 to 12 are diagrams illustrating examples of the structures of the main grooves. FIG. 5 is an enlarged view illustrating a part of FIG. 2. FIGS. 6 to 8 are diagrams illustrating examples of the cross-sectional shape of the main groove 22A in FIG. 5. FIG. 6 is a diagram illustrating the cross-sectional shape of the main groove 22A at a point P5' in FIG. 5. FIG. 7 is a diagram illustrating the cross-sectional shape of the main groove 22A at a point P6' in FIG. 5. FIG. 8 is a diagram illustrating the cross-sectional shape of the main groove 22A at a point P56 in FIG. 5.

Here, angles of the groove walls on both sides of the main grooves 22A, 22B, 23 with respect to normal lines N of the tread surfaces are referred to as groove wall angles. The groove wall angles of the main grooves 22A, 22B, 23 are preferably 10 degrees or more and 35 degrees or less. When the groove wall angle is less than 10 degrees, dry performance is degraded. Accordingly, when the groove wall angle exceeds 35 degrees, wet performance is degraded, which is not preferred.

In FIG. 5, among edges of the road contact surface of the block BK1 defined by the lug grooves 24, intersection points between an imaginary line H 12 and an imaginary line H13 as extensions of two respective edges E3, E4, which are adjacent to one another in the tire circumferential direction across an edge E1, and the groove center line 220 of the main groove 22A are defined as the point P5 and the point P6. A point moved by a predetermined distance Lb1' in a direction of the point P5 approaching the point P6 is the point P5'. A point moved by the predetermined distance Lb1' in a direction of the point P6 approaching the point P5 is the point P6'. The point P56 is a midpoint of a length Lb1 from the point P5 to the point P6 in the tire circumferential direction.

FIG. 6 is a cross-sectional view of the main groove 22A taken along an imaginary line H21 parallel to the imaginary line H12 at the point P5' in FIG. 5, and viewed from the direction of the arrow Y1. As illustrated in FIG. 6, a step portion 222 is provided between groove opening end portions 22Ab of the main groove 22A to the tread surfaces 21 and a groove bottom 221. An end portion 222T on the groove center side of the step portion 222 is a bend point where an angle of a groove wall 22Aa with respect to the normal line N of the tread surface 21 changes. In other words, the groove wall 22Aa has the bend point. The bend point by the end portion 222T in FIG. 6, which is the cross-sectional view of the main groove 22A, is seen as a ridge line 222R in FIG. 5, which is a plan view.

In FIG. 6, the angles of the groove walls 22Aa on both sides of the main groove 22A with respect to the normal lines N of the tread surfaces are denoted as $\alpha$15 and $\alpha$25. The angle $\alpha$15 is 30 degrees, for example. The angle $\alpha$25 is 15 degrees, for example. Thus, in the present example, the angle difference between the angle $\alpha$15 and the angle $\alpha$25 is 15 degrees. The angle difference between the angle $\alpha$15 and the angle $\alpha$25 is preferably 1 degree or more and 15 degrees or less. The angle difference in excess of 15 degrees produces uneven block rigidity. This degrades uneven wear resistance performance, which is not preferred.

FIG. 7 is a diagram illustrating the cross-sectional shape of the main groove 22A taken along an imaginary line H22 parallel to the imaginary line H13 at the point P6' in FIG. 5, and viewed from the direction of the arrow Y2. Similarly to FIG. 6, the end portion 222T is the bend point where the angle of the groove wall 22Aa with respect to the normal line N of the tread surface 21 changes. The bend point by the end portion 222T in FIG. 7 is seen as the ridge line 222R in FIG. 5, which is a plan view.

In FIG. 7, the angles of the groove walls 22Aa on both sides of the main groove 22A with respect to the normal lines N of the tread surfaces are denoted as $\alpha$16 and $\alpha$26. The angle $\alpha$16 is 15 degrees, for example. The angle $\alpha$26 is 30 degrees, for example. Thus, in the present example, the angle difference between the angle $\alpha$16 and the angle $\alpha$26 is 15 degrees. The angle difference between the angle $\alpha$16 and the angle $\alpha$26 is preferably 1 degree or more and 15 degrees or less. The angle difference in excess of 15 degrees produces uneven block rigidity. This degrades uneven wear resistance performance, which is not preferred.

FIG. 8 is a diagram illustrating the cross-sectional shape of the main groove 22A taken along an imaginary line HM1 orthogonal to the groove center line 220 at the point 56 in FIG. 5, and viewed from the direction of the arrow Y3. Similarly to FIGS. 6 and 7, the end portion 222T is the bend point where the angle of the groove wall 22Aa with respect to the normal line N of the tread surface 21 changes. The bend point by the end portion 222T in FIG. 8 is seen as the ridge line 222R in FIG. 5, which is a plan view.

In FIG. 8, the angles of the groove walls 22Aa on both sides of the main groove 22A with respect to the normal lines N of the tread surfaces are denoted as $\alpha$17 and $\alpha$27. The angle $\alpha$17 is 15 degrees, for example. The angle $\alpha$27 is 15 degrees, for example. That is, the angle $\alpha$17 and the angle $\alpha$27 are equal. That is, at the point P56, which is the midpoint between the two points P5 and P6 along the groove center line 220, the angles of the groove walls 22Aa on both sides of the main groove 22A with respect to the normal lines N of the tread surfaces 21 are equal. The equal angles at the point P56 allows maintaining the rigidity of the blocks BK on both sides of the main groove 22A, and uneven wear resistance performance can be improved.

Figure 9:
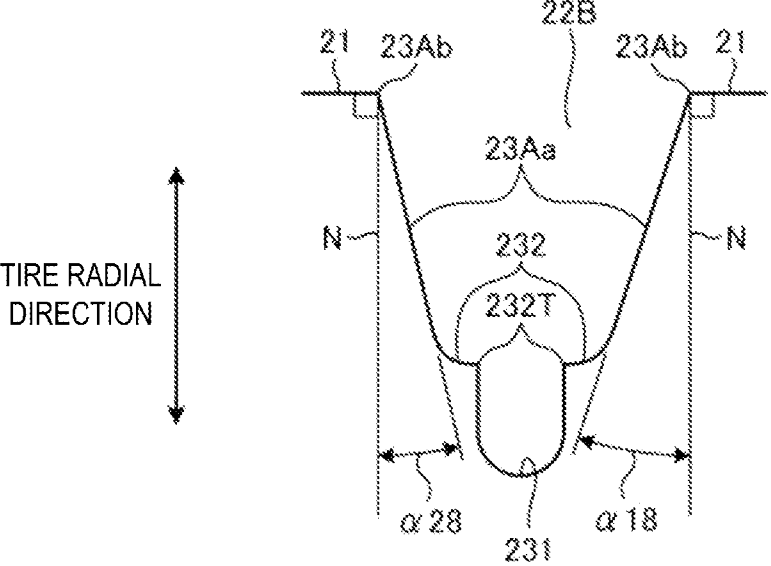
FIG. 9 is a diagram illustrating an example of the structure of the main groove.
Figure 10:
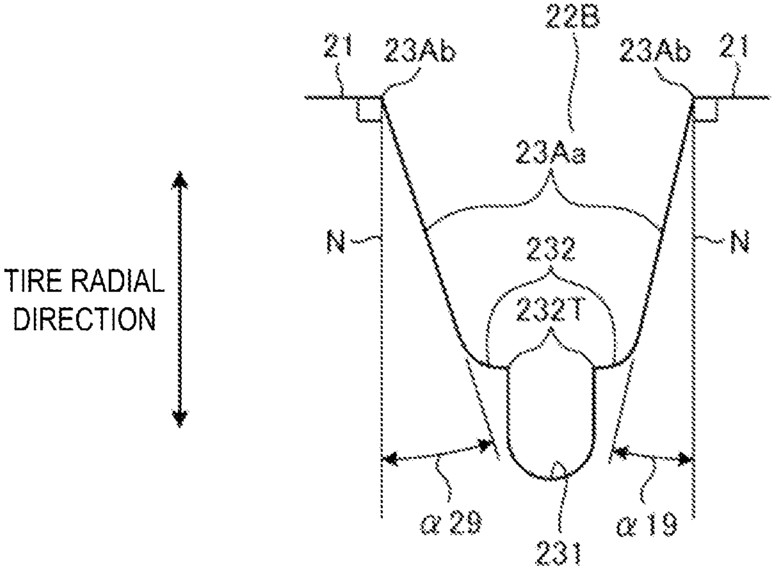
FIG. 10 is a diagram illustrating an example of the structure of the main groove.
Figure 11:
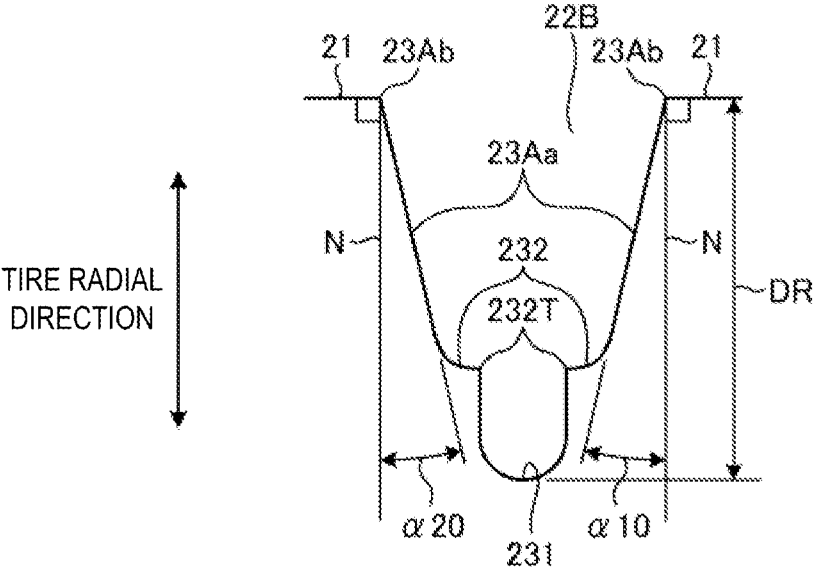
FIG. 11 is a diagram illustrating an example of the structure of the main groove.

FIGS. 9 to 11 are diagrams illustrating an example of the cross-sectional shape of the main groove 22B in FIG. 5. FIG. 9 is a diagram illustrating the cross-sectional shape of the main groove 22B at a point P7' in FIG. 5. FIG. 10 is a diagram illustrating the cross-sectional shape of the main groove 22B at a point P8' in FIG. 5. FIG. 11 is a diagram illustrating the cross-sectional shape of the main groove 22B at a point P78 in FIG. 5.

In FIG. 5, among edges of the road contact surface of the block BK2 defined by the lug grooves 24, intersection points between an imaginary line H16 and an imaginary line H18 as extensions of two respective edges E5, E6, which are adjacent to one another in the tire circumferential direction across an edge E2, and the groove center line 230 of the main groove 22B are defined as the point P7 and the point P8. A point moved by a predetermined distance Lb2' in a direction of the point P7 approaching the point P8 is the point P7'. A point moved by the predetermined distance Lb2' in a direction of the point P8 approaching the point P7 is the point P8'. The point P78 is a midpoint of a length Lb2 from the point P7 to the point P8 in the tire circumferential direction.

FIG. 9 is a cross-sectional view of the main groove 22B taken along an imaginary line H23 parallel to the imaginary line H16 at the point P7' in FIG. 5, and viewed from the direction of the arrow Y4. As illustrated in FIG. 9, a step portion 232 is provided between groove opening end portions 23Ab of the main groove 22B to the tread surfaces 21 and a groove bottom 231. An end portion 232T on the groove center side of the step portion 232 is a bend point where an angle of a groove wall 23Aa with respect to the normal line N of the tread surface 21 changes. In other words, the groove wall 23Aa has the bend point. The bend point by the end portion 232T in FIG. 9 is seen as a ridge line 232R in FIG. 5, which is a plan view.

In FIG. 9, the angles of the groove walls 23Aa on both sides of the main groove 22B with respect to the normal lines N of the tread surfaces are denoted as $\alpha$18 and $\alpha$28. The angle $\alpha$18 is 18 degrees, for example. The angle $\alpha$28 is 13 degrees, for example. Thus, in the present example, the angle difference between the angle $\alpha$18 and the angle $\alpha$28 is 5 degrees. The angle difference between the angle $\alpha$18 and the angle $\alpha$28 is preferably 1 degree or more and 15 degrees or less. The angle difference in excess of 15 degrees produces uneven block rigidity. This degrades uneven wear resistance performance, which is not preferred.

The angle difference between the angle $\alpha$15 and the angle $\alpha$25, which have been described with reference to FIG. 6, is greater than the angle difference between the angle $\alpha$18 and the angle $\alpha$28. The increase in angle difference on the inner side in the tire width direction and the decrease in angle difference on the outer side in the tire width direction allow improving uneven wear resistance performance.

FIG. 10 is a diagram illustrating the cross-sectional shape of the main groove 22B taken along an imaginary line H24 parallel to an imaginary line H18 at the point P8' in FIG. 5, and viewed from the direction of the arrow Y5. Similarly to FIG. 9, the end portion 232T is the bend point where the angle of the groove wall 23Aa with respect to the normal line N of the tread surface 21 changes. The bend point by the end portion 232T in FIG. 10 is seen as the ridge line 232R in FIG. 5, which is a plan view.

In FIG. 10, the angles of the groove walls 23Aa on both sides of the main groove 22B with respect to the normal lines N of the tread surfaces are denoted as $\alpha$19 and $\alpha$29. The angle $\alpha$19 is 13 degrees, for example. The angle $\alpha$29 is 18 degrees, for example. Thus, in the present example, the angle difference between the angle $\alpha$19 and the angle $\alpha$29 is 5 degrees. The angle difference between the angle $\alpha$19 and the angle $\alpha$29 is preferably 1 degree or more and 15 degrees or less. The angle difference in excess of 15 degrees produces uneven block rigidity. This degrades uneven wear resistance performance, which is not preferred.

The angle difference between the angle $\alpha$16 and the angle $\alpha$26, which have been described with reference to FIG. 7, is greater than the angle difference between the angle $\alpha$19 and the angle $\alpha$29. The increase in angle difference on the inner side in the tire width direction and the decrease in angle difference on the outer side in the tire width direction allow improving uneven wear resistance performance.

FIG. 11 is a diagram illustrating the cross-sectional shape of the main groove 22B taken along an imaginary line HM2 orthogonal to the groove center line 230 at the point P78 in FIG. 5, and viewed from the direction of the arrow Y6. Similarly to FIGS. 9 and 10, the end portion 232T is the bend point where the angle of the groove wall 23Aa with respect to the normal line N of the tread surface 21 changes. The bend point by the end portion 232T in FIG. 11 is seen as the ridge line 232R in FIG. 5, which is a plan view.

In FIG. 11, the angles of the groove walls 23Aa on both sides of the main groove 22B with respect to the normal lines N of the tread surfaces are denoted as $\alpha$10 and $\alpha$20. The angle $\alpha$10 is 13 degrees, for example. The angle $\alpha$20 is 13 degrees, for example. That is, the angle $\alpha$10 and the angle $\alpha$20 are equal. That is, at the point P78, which is the midpoint between the two points P7 and P8 along the groove center line 230, the angles of the groove walls 23Aa on both sides of the main groove 22B with respect to the normal lines N of the tread surfaces 21 are equal. The equal angles at the point P78 allow maintaining the rigidity of the blocks BK on both sides of the main groove 22B, and uneven wear resistance performance is improved.

Figure 12:
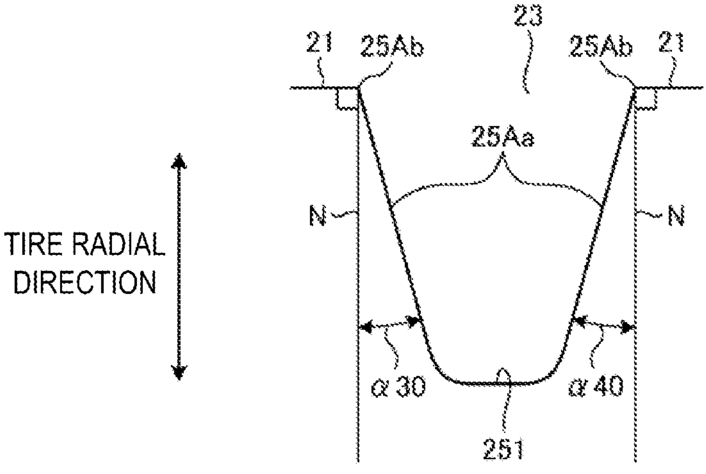
FIG. 12 is a diagram illustrating an example of the structure of the main groove.

FIG. 12 is a diagram illustrating the cross-sectional shape of the main groove 23 taken along an imaginary line HM3 orthogonal to the groove center line 210 in FIG. 3, and viewed from the direction of the arrow Y7. As illustrated in FIG. 12, different from the other main grooves 22A, 22B, a step portion is not provided between groove opening end portions 25Ab of the main groove 23 to the tread surfaces 21 and a groove bottom 251. In FIG. 12, angles of groove walls 25Aa on both sides of the main groove 23 with respect to the normal lines N of the tread surfaces are denoted as $\alpha$30 and $\alpha$40. The angle $\alpha$30 is 15 degrees, for example. The angle $\alpha$40 is 15 degrees, for example. That is, the angle $\alpha$30 and the angle $\alpha$40 are equal. The equal angles $\alpha$30, $\alpha$40 allow maintaining the rigidity of the blocks BK3 of the main groove 23 on the inner side in the tire width direction and the rigidity of the land portion 20S, thus improving uneven wear resistance performance.

Width of Lug Groove

Figure 13:
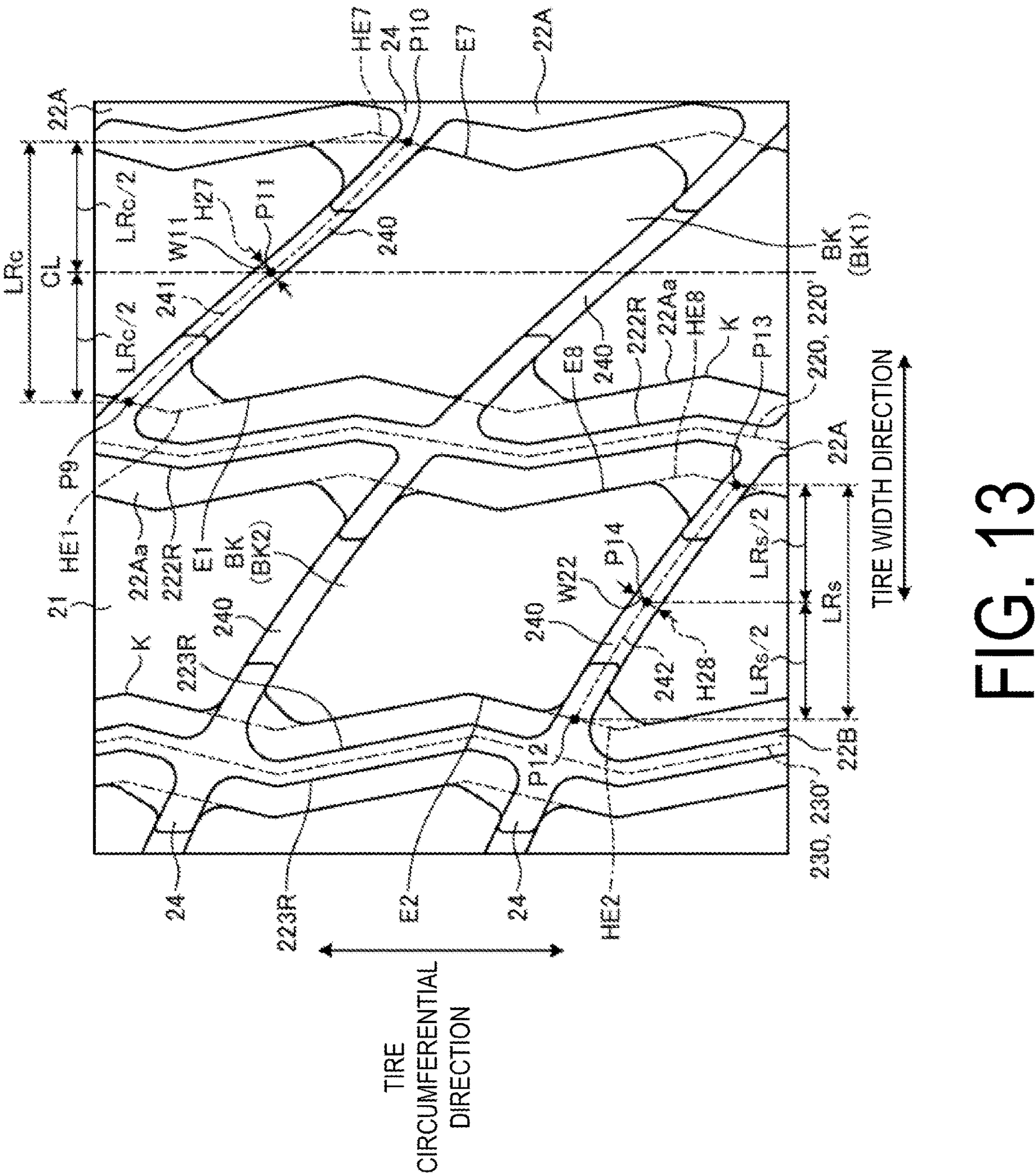
FIG. 13 is an enlarged view illustrating a part of FIG. 2.

FIG. 13 is an enlarged view illustrating a part of FIG. 2. FIG. 13 is an enlarged view illustrating a portion C in FIG. 2. In FIG. 13, a midpoint of a distance LRc in the tire width direction between two imaginary lines HE1, HE7, which are extensions of respective edges E1, E7 of the block BK1 defined by the main grooves 22A, 22A adjacent in the tire width direction, and intersection points P9, P10 of a groove center line 241 of the lug groove 24 is denoted as P11. A groove width of the lug groove 24 along an imaginary line H27, which passes through the midpoint P11 and is orthogonal to the groove center line 241, is denoted as W11. Additionally, a midpoint of a distance LRs in the tire width direction between two imaginary lines HE2, HE8, which are extensions of respective edges E1, E8 of the block BK2 defined by the main grooves 22A, 22B adjacent in the tire width direction, and intersection points P12, P13 of a groove center line 242 of the lug groove 24 is denoted as P14. A groove width of the lug groove 24 along an imaginary line H28, which passes through the midpoint P14 and is orthogonal to the groove center line 242, is denoted as W22.

Additionally, in FIG. 4, a midpoint of a distance LRd in the tire width direction between two imaginary lines HE9, HE10, which are extensions of respective edgesE9, E10 of the block BK3 defined by the main grooves 22B, 23 adjacent in the tire width direction, and intersection points P21, P22 of a groove center line 243 of the lug groove 24 is denoted as P23. A groove width of the lug groove 24 along an imaginary line H20, which passes through the midpoint P23 and is orthogonal to the groove center line 243, is denoted as W20.

Regarding the groove widths W11, W22, W20 described above, both of a ratio W22/W11 of the groove width W22 to the groove width W11 and a ratio W20/W11 of the groove width W20 to the groove width Wi are preferably 0.60 or more and 1.10 or less. The ratio W22/W11 or the ratio W20/W11 being less than 0.60 degrades wet performance, which is not preferred. The ratio W22/W11 or the ratio W20/W11 in excess of 1.10 degrades dry performance, which is not preferred.

Additionally, in FIG. 3, a tire circumferential length of the lug groove 30 of the land portion 20S is denoted as Wrsh. A ratio Wrsh/W20 of the length Wrsh to the groove width W20 of the lug groove 24 is preferably 2.0 or more and 3.0 or less. The ratio Wrsh/W20 being less than 2.0 degrades dry performance, which is not preferred. The ratio Wrsh/W20 in excess of 3.0 degrades uneven wear resistance performance, which is not preferred.

Chamfering of Block

As illustrated in FIG. 3, the block BK1 preferably includes chamfered portions C11, C12, C11', and C12' provided at respective corner portions. The block BK2 preferably includes chamfered portions C13, C14, C15, and C16 provided at respective corner portions. The block BK3 preferably includes chamfered portions C17, C18, C19, and C20 provided at respective corner portions. In this way, providing the chamfered portions C11 to C20 at the respective corner portions of the blocks BK ensures maintaining the rigidity of the respective blocks BK, and uneven wear resistance performance is improved.

Groove Depths of Main Groove and Lug Groove

The raised bottom portions 240 are provided in regions including the midpoints P11, P14, P23 of the lug grooves 24. In the present example, the groove depth of the lug groove 24 is equal to the groove depths of the main grooves 22A, 22B, 23. However, in the lug groove 24, the groove depth of the portion where the raised bottom portion 240 is provided is shallower than the groove depths of the main grooves 22A, 22B, 23. Note that a maximum value of a groove depth DR of the main groove 22A is 19.1 mm, for example.

Figure 14:
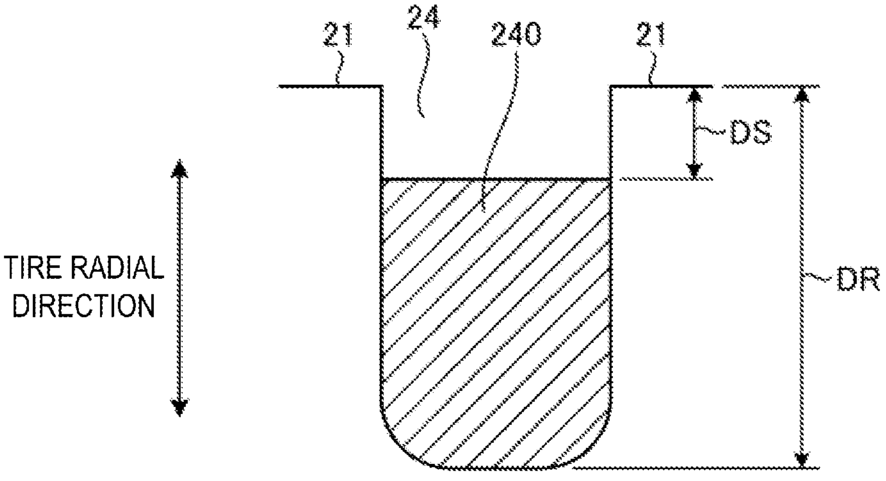
FIG. 14 is a diagram illustrating a relationship between groove depths of the lug groove and a raised bottom portion.

FIG. 14 is a diagram illustrating a relationship between the groove depths of the lug groove 24 and the raised bottom portion 240. As illustrated by hatching in FIG. 14, by providing the raised bottom portion 240 where the groove bottom is raised, the groove depth of the lug groove 24 is shallower than the other portion. In other words, a groove depth DS of the portion of the raised bottom portion 240 is smaller than the portion where the raised bottom portion 240 is not provided of the lug groove 24, that is, the original groove depth.

Here, the groove depths of the main grooves 22A, 22B, 23 are denoted as DR. A ratio DS/DR of the groove depth DS to the groove depth DR is preferably 0.15 or more and 0.35 or less. The ratio DS/DR being smaller than 0.15 shallows the lug groove 24 and degrades wet performance, which is not preferred. The ratio DS/DR being greater than 0.35 deepens the lug groove 24, reduces block rigidity, and degrades uneven wear resistance performance, which are not preferred.

When the groove depths DR of the main grooves 22A, 22B, 23 are equal to the original groove depth of the lug grooves 24, similarly, the ratio of the groove depth DS to the original groove depth of the lug grooves 24 is preferably 0.15 or more and 0.35 or less.

MODIFIED EXAMPLES

Figure 15:
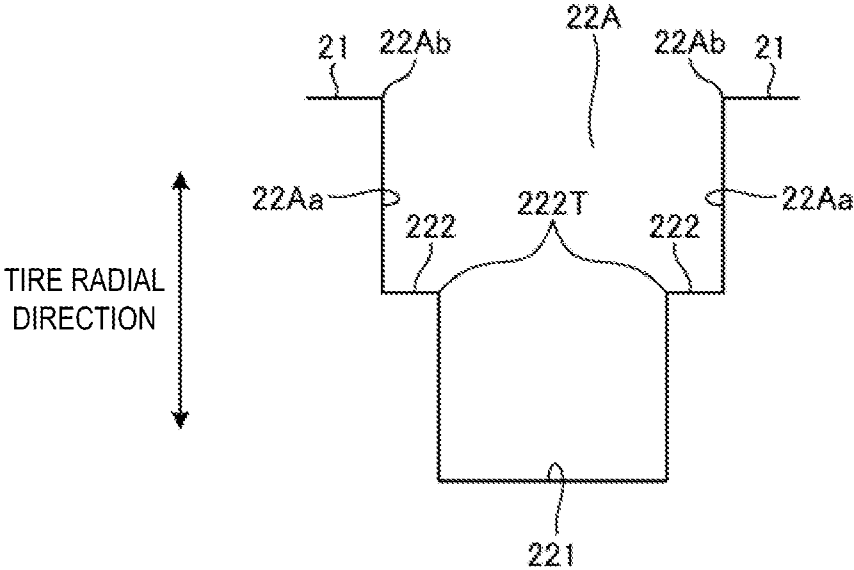
FIG. 15 is a diagram illustrating a modified example of a cross-sectional shape of the main groove.
Figure 16:
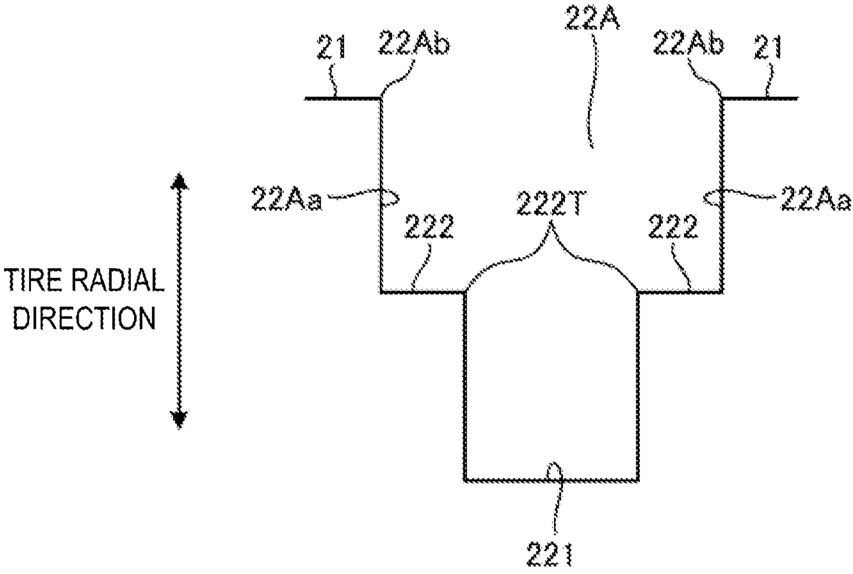
FIG. 16 is a diagram illustrating a modified example of the cross-sectional shape of the main groove.
Figure 17:
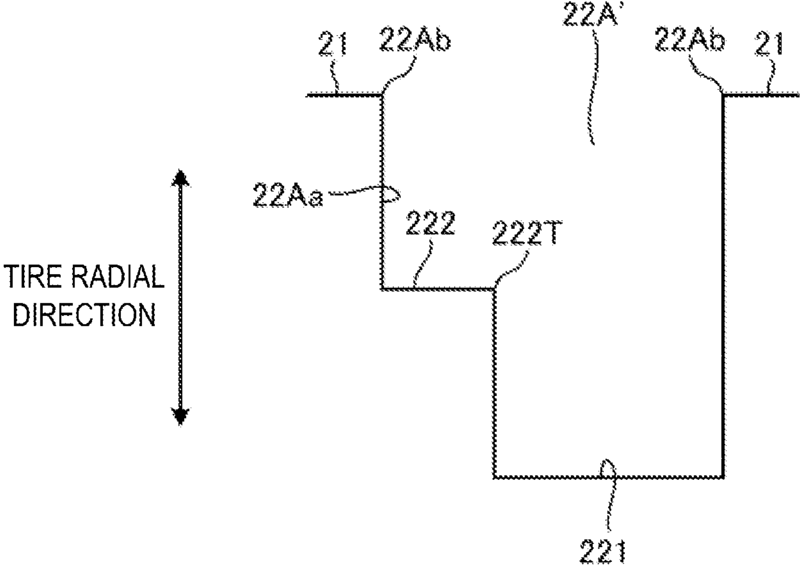
FIG. 17 is a diagram illustrating a modified example of the cross-sectional shape of the main groove.
Figure 18:
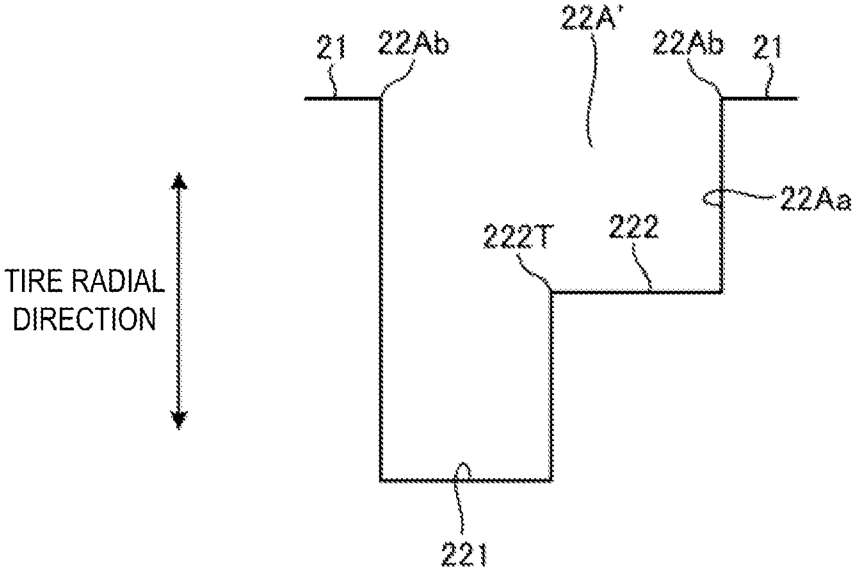
FIG. 18 is a diagram illustrating a modified example of the cross-sectional shape of the main groove.
Figure 19:
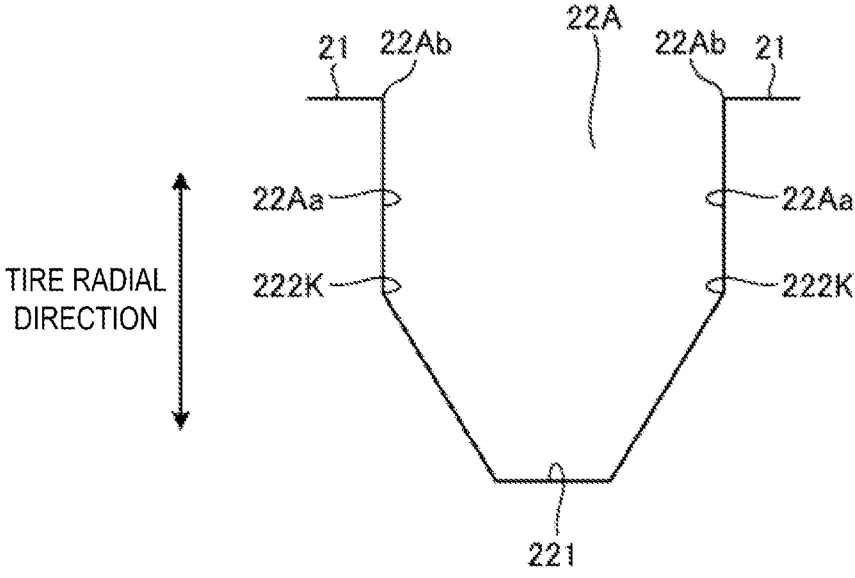
FIG. 19 is a diagram illustrating a modified example of the cross-sectional shape of the main groove.
Figure 20:
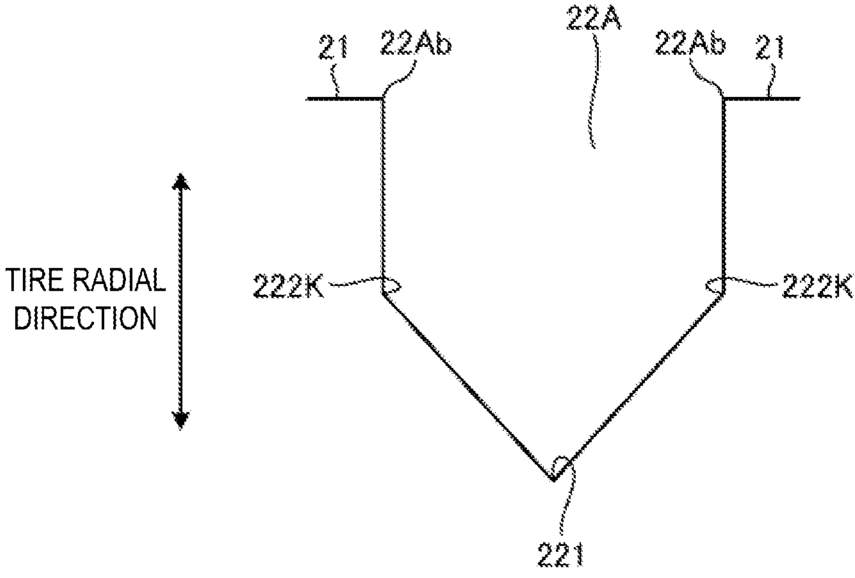
FIG. 20 is a diagram illustrating a modified example of the cross-sectional shape of the main groove.
Figure 21:
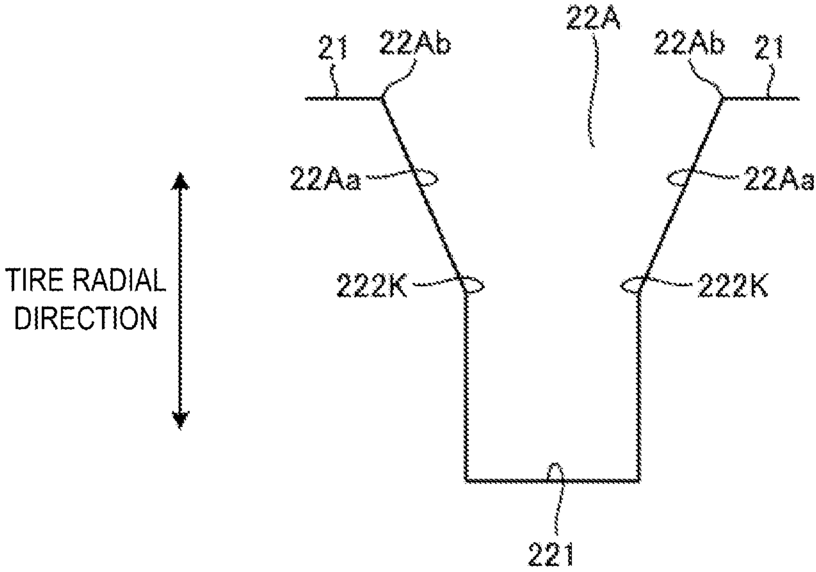
FIG. 21 is a diagram illustrating a modified example of the cross-sectional shape of the main groove.
Figure 22:
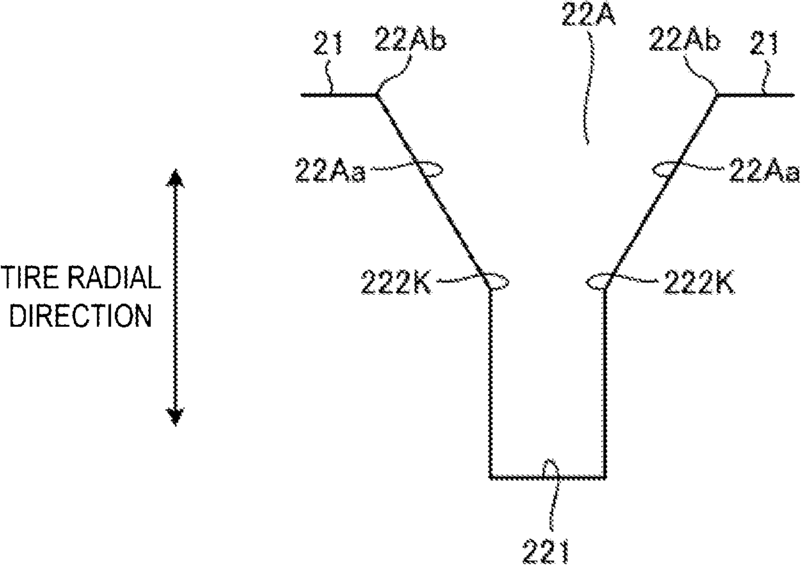
FIG. 22 is a diagram illustrating a modified example of the cross-sectional shape of the main groove.

FIGS. 15 to 24 are drawings illustrating the modified examples of the cross-sectional shape of the main groove 22A. FIGS. 15 to 18 illustrate examples in which the step portions 222 are provided on the groove wall. In the examples of FIGS. 15 and 16, the step portions 222 are provided on groove walls on both sides of the main groove 22A. In the examples of FIGS. 17 and 18, the step portion 222 is provided on a groove wall on one side of a main groove 22A'. As described with reference to, for example, FIGS. 3 and 4, the end portion 222T of the step portion 222 is seen as the ridge line 222R.

Figure 23:
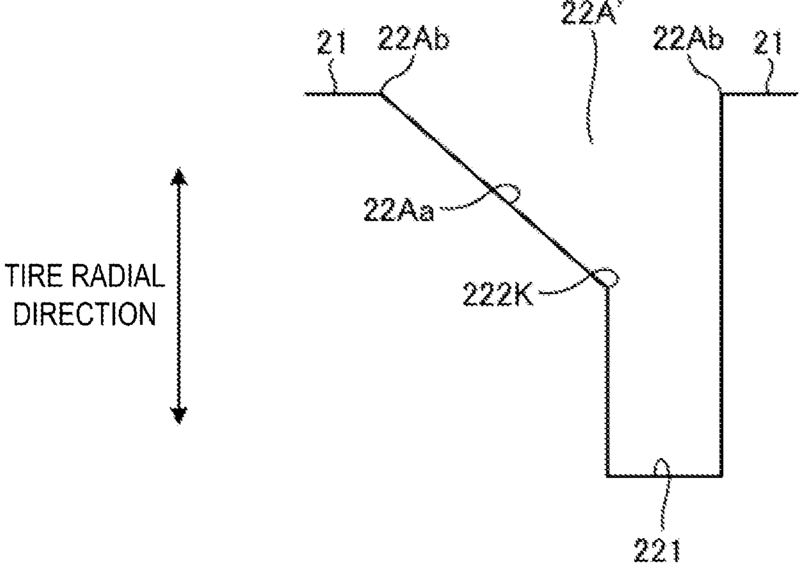
FIG. 23 is a diagram illustrating a modified example of the cross-sectional shape of the main groove.
Figure 24:
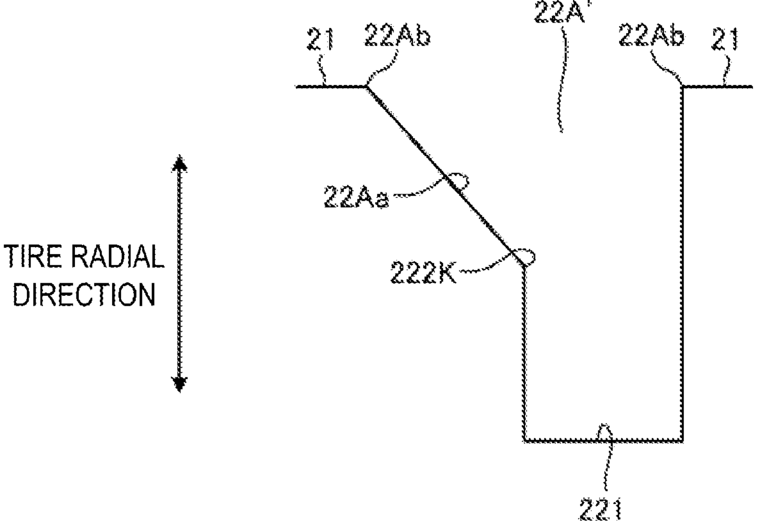
FIG. 24 is a diagram illustrating a modified example of the cross-sectional shape of the main groove.

As illustrated from FIGS. 19 to 24, the main groove 22A may include bend points 222K instead of the step portions in the meridian cross-section. In the examples from FIGS. 19 to 22, the bend points 222K are provided on groove walls on both sides of the main groove 22A. In the examples of FIGS. 23 and 24, the bend point 222K is provided on a groove wall on one side of the main groove 22A'. As described with reference to, for example, FIG. 6, the bend point 222K is seen as the ridge line 222R.

As described with reference to FIGS. 15 to 24, the bend points may be provided on the groove walls on both sides in the extension direction of the main groove 22A, or the bend point may be provided on only one of the groove walls on both sides. In other words, it is sufficient that the bend point is provided on at least one of the groove walls on both sides in the extension direction of the main groove 22A. Providing the bend point on at least one of the groove walls on both sides of the main groove 22A allows improving rolling resistance performance and snow traction performance. Note that in the case where the bend point is provided on only one of the groove walls on both sides, the bend point is preferably provided on the groove wall on the inner side in the tire width direction.

Although the cross-sectional shapes of the main grooves 22A have been described with reference to FIGS. 15 to 24, a similar modified example can be employed for the cross-sectional shape of the main groove 22B.

In the embodiment described above, the pneumatic tire has been described as an example of the tire as described above. However, the configuration is not limited thereto, and the configurations described in this embodiment can be optionally applied to other tires as well within the scope apparent to those skilled in the art. Examples of other tires include airless tires and solid tires.

EXAMPLES

In the present examples, performance tests for rolling resistance performance and snow traction performance were performed on a plurality of types of tires of different conditions (see from Table 1 to Table 10). In the performance tests, tires (heavy duty tires) with a size of 455/55R22.5 were mounted on 22.5 inches×14.00 inches rims, inflated to a standard maximum air pressure (900 kPa), and mounted on a drive shaft of a test vehicle (2-D, tractor head), and the actual vehicle evaluation was performed with a standard maximum load applied.

In the evaluation of dry performance, time required for a speed of the test vehicle to reach 40 km/h from 5 km/h was measured on a dry road surface and indexed. Results are expressed as index values with the result of Conventional Example being assigned the value of (100). Larger index values indicate excellent dry performance.

In the evaluation of wet performance, a time required for the speed of the test vehicle to reach 20 km/h from 5 km/h was measured on a wet asphalt road surface that had been sprayed to a water depth of 1 mm and indexed. Results are expressed as index values with the result of Conventional Example being assigned the value of (100). Larger index values indicate excellent wet performance.

In the evaluation of uneven wear resistance performance, an amount of heel and toe wear after the test vehicle traveled for 50000 km on a dry asphalt road surface was measured by market monitor and indexed. Results are expressed as index values with the result of Conventional Example being assigned the value of (100). The larger index values are, the smaller the amount of heel and toe wear is, and this indicates excellent uneven wear resistance performance.

All tires of Example 1 to Example 65 from Table 1 to Table 5 include a center main groove having a zigzag shape in which first linear portions and second linear portions having mutually different inclination angles in the tire width direction with respect to the tire circumferential direction are alternately connected and outer main grooves having a zigzag shape in which long linear portions and short linear portions having mutually different inclination angles in the tire width direction with respect to the tire circumferential direction and different tire circumferential lengths are alternately connected.

Additionally, in the tires of Examples 1 to 65, the ratio LC1/PDc is 0.40 or more and 0.60 or less, the ratio Ls1/PDs is 0.45 or more and 0.75 or less, and further the ratio PDs/PDc is 0.90 or more and 1.20 or less. In the tires of Example 1 to Example 65, the lug groove intersects with the short linear portion or intersects with the long linear portion, the ratio φ12/PDc is 0.60 or more and 0.85 or less or not, the ratio φ13/PDc is 0.95 or more and 1.15 or less or not, the inclination angle of the lug groove is larger in the land portion on the outer side than an inclination angle of the center land portion or not, the inclination angle θ1 is 20 degrees or more and 60 degrees or less or not, the inclination angle θ2 is 60 degrees or more and 89 degrees or less or not, the inclination angle θ3 is 60 degrees or more and 85 degrees or lesss or not, the ratio Wb2/Wb1 is 0.80 or more and 1.00 or less or not, the ratio Wb3/Wb1 is 0.90 or more and 1.10 or less or not, the ratio Wb5/Wb4 is 0.75 or more and 1.00 or less or not, the ratio Wb6/Wb4 is 0.65 or more and 0.85 or less or not, the tire circumferential lengths of the short linear portion and the long linear portion are 15 mm or more and 45 mm or less or not, the ratio W22/W11 is 0.60 or more and 1.10 or less or not, the ratio W20/W11 is 0.60 or more and 1.10 or less or not, the ratio L/TW is 0.30 or more and 0.60 or less or not, the ratio PHDs/PHDc is 1.15 or more and 1.50 or less or not, the ratio PHDd/PHDc is 0.90 or more and 1.20 or less or not, the ratio SBK2/SBK1 is 0.85 or more and 1.05 or less or not, the ratio SBK3/SBK1 is 0.85 or more and 1.05 or less or not, the lug groove shape is the S-shape or the linear shape, the outer main grooves have similar shapes or not (non-similar shapes), the outer opening lug groove is provided or not, the ratio Wrsh/W20 is 2.0 or more and 3.0 or less or not, the ratio DS/DR is 0.15 or more and 0.35 or less or not, the groove wall angle of the main groove is 10 degrees or more and 35 degrees or less or not, the bending is present in the groove wall or not, the block end portions are chamfered or not.

The tire of Conventional Example in Table 1 includes land portions defined by three straight main grooves and includes a center land portion having a road contact surface formed of square blocks. A tire of Comparative Example 1 in Table 1 has the ratio LC1/PDc of 0.40, the ratio Ls1/PDs of 0.80, and the ratio PDs/PDc of 1.20. A tire of Comparative Example 2 in Table 1 has the ratio LC1/PDc of 0.50, the ratio Ls1/PDs of 0.80, and the ratio PDs/PDc of 1.20. A tire of Comparative Example 3 in Table 1 has the ratio LC1/PDc of 0.60, the ratio Ls1/PDs of 0.80, and the ratio PDs/PDc of 1.20.

As shown in the test results from Table 1 to Table 10, it is seen that the tires of the respective Examples have excellent dry performance, wet performance, and uneven wear resistance performance.

TABLE 1

| | Conventional Example | Comparative Example 1 | Comparative Example 2 | Comparative Example 3 |
|---|---|---|---|---|
| Ratio LC1/PDc | — | 0.40 | 0.50 | 0.60 |
| Ratio Ls1/PDs | — | 0.80 | 0.80 | 0.80 |
| Ratio PDs/PDc | — | 1.20 | 1.20 | 1.20 |
| Intersection position of lug groove | — | Long linear portion | Long linear portion | Long linear portion |
| Ratio φ12/PDc | 0.50 | 0.50 | 0.50 | 0.50 |
| Ratio φ13/PDc | 0.85 | 0.85 | 0.85 | 0.85 |
| Size relationship of inclination angles of lug grooves | Large on center | Large on center | Equal | Equal |
| Inclination angle θ1 (degree) | 15 | 15 | 15 | 15 |
| Inclination angle θ2 (degree) | 87 | 87 | 87 | 87 |
| Inclination angle θ3 (degree) | 90 | 90 | 90 | 90 |
| Ratio Wb2/Wb1 | 0.70 | 0.70 | 0.70 | 0.70 |
| Ratio Wb3/Wb1 | 0.80 | 0.80 | 0.80 | 0.80 |
| Ratio Wb5/Wb4 | 0.60 | 0.60 | 0.60 | 0.60 |
| Ratio Wb6/Wb4 | 0.55 | 0.55 | 0.55 | 0.55 |
| Tire circumferential lengths of short linear portion and | Greater than 3 mm and less | Greater than 3 mm and less | Greater than 3 mm and less | Greater than 3 mm and less |

TABLE 1-continued

| | | | | |
|---|---|---|---|---|
| long linear portion (mm) | than 15 mm | than 15 mm | than 15 mm | than 15 mm |
| Ratio W22/W11 | 0.50 | 0.50 | 0.50 | 0.50 |
| Ratio W20/W11 | 0.50 | 0.50 | 0.50 | 0.50 |
| Ratio L/TW | 0.25 | 0.25 | 0.25 | 0.25 |
| Ratio PHDs/PHDc | 0.95 | 0.95 | 0.95 | 0.95 |
| Ratio PHDd/PHDc | 0.8 | 0.8 | 0.8 | 0.8 |
| Ratio SBK2/SBK1 | 0.80 | 0.80 | 0.80 | 0.80 |
| Ratio SBK3/SBK1 | 0.80 | 0.80 | 0.80 | 0.80 |
| Lug groove shape | Linear shape | Linear shape | Linear shape | Linear shape |
| Relationship between outer main grooves | — | Non-similar shapes | Non-similar shapes | Non-similar shapes |
| Outer opening lug groove | No | No | No | No |
| Ratio Wrsh/W20 | 1.5 | 1.5 | 1.5 | 1.5 |
| Ratio DS/DR | 0.10 | 0.10 | 0.10 | 0.10 |
| Groove wall angle of main groove (degree) | 5 | 5 | 5 | 5 |
| Bending of groove wall | No | No | No | No |
| Chamfering of block end portions | No | No | No | No |
| Dry performance | 100 | 101 | 101 | 101 |
| Wet performance | 100 | 100 | 100 | 100 |
| Uneven wear resistance performance | 100 | 100 | 101 | 100 |

| Content | Example 1 | Example 2 | Example 3 |
|---|---|---|---|
| Ratio LC1/PDc | 0.50 | 0.50 | 0.50 |
| Ratio Ls1/PDs | 0.45 | 0.60 | 0.75 |
| Ratio PDs/PDc | 1.20 | 1.20 | 0.90 |
| Intersection position of lug groove | Long linear portion | Long linear portion | Long linear portion |
| Ratio φ12/PDc | 0.50 | 0.50 | 0.50 |
| Ratio φ13/PDc | 0.85 | 0.85 | 0.85 |
| Size relationship of inclination angles of lug grooves | Equal | Equal | Equal |
| Inclination angle θ1 (degree) | 15 | 15 | 15 |
| Inclination angle θ2 (degree) | 87 | 87 | 87 |
| Inclination angle θ3 (degree) | 90 | 90 | 90 |
| Ratio Wb2/Wb1 | 0.70 | 0.70 | 0.70 |
| Ratio Wb3/Wb1 | 0.80 | 0.80 | 0.80 |
| Ratio Wb5/Wb4 | 0.60 | 0.60 | 0.60 |
| Ratio Wb6/Wb4 | 0.55 | 0.55 | 0.55 |
| Tire circumferential lengths of short linear portion and long linear portion (mm) | Greater than 3 mm and less than 15 mm | Greater than 3 mm and less than 15 mm | Greater than 3 mm and less than 15 mm |
| Ratio W22/W11 | 0.50 | 0.50 | 0.50 |
| Ratio W20/W11 | 0.50 | 0.50 | 0.50 |
| Ratio L/TW | 0.25 | 0.25 | 0.25 |
| Ratio PHDs/PHDc | 0.95 | 0.95 | 0.95 |
| Ratio PHDd/PHDc | 0.8 | 0.8 | 0.8 |
| Ratio SBK2/SBK1 | 0.80 | 0.80 | 0.80 |
| Ratio SBK3/SBK1 | 0.80 | 0.80 | 0.80 |
| Lug groove shape | Linear shape | Linear shape | Linear shape |
| Relationship between outer main grooves | Non-similar shapes | Non-similar shapes | Non-similar shapes |
| Outer opening lug groove | No | No | No |
| Ratio Wrsh/W20 | 1.5 | 1.5 | 1.5 |
| Ratio DS/DR | 0.10 | 0.10 | 0.10 |
| Groove wall angle of main groove (degree) | 5 | 5 | 5 |
| Bending of groove wall | No | No | No |
| Chamfering of block end portions | No | No | No |
| Dry performance | 102 | 103 | 102 |
| Wet performance | 102 | 103 | 102 |
| Uneven wear resistance performance | 102 | 103 | 101 |

TABLE 2

| | Example 4 | Example 5 | Example 6 | Example 7 | Example 8 | Example 9 | Example 10 |
|---|---|---|---|---|---|---|---|
| Ratio LC1/PDc | 0.50 | 0.50 | 0.50 | 0.50 | 0.50 | 0.50 | 0.50 |
| Ratio Ls1/PDs | 0.60 | 0.60 | 0.60 | 0.60 | 0.60 | 0.60 | 0.60 |
| Ratio PDs/PDc | 1.00 | 1.10 | 1.00 | 1.00 | 1.00 | 1.00 | 1.00 |
| Intersection | Long | Long | Short | Short | Short | Short | Short |

TABLE 2-continued

| | Example 4 | Example 5 | Example 6 | Example 7 | Example 8 | Example 9 | Example 10 |
|---|---|---|---|---|---|---|---|
| position of lug groove | linear portion | linear portion | linear portion | linear portion | linear portion | linear portion | linear portion |
| Ratio φ12/PDc | 0.50 | 0.50 | 0.50 | 0.60 | 0.85 | 0.75 | 0.75 |
| Ratio φ13/PDc | 0.85 | 0.85 | 0.85 | 0.95 | 1.15 | 1.05 | 1.05 |
| Size relationship of inclination angles of lug grooves | Equal | Equal | Large on outer side | Large on outer side | Large on outer side | Large on outer side | Large on outer side |
| Inclination angle θ1 (degree) | 15 | 15 | 15 | 15 | 15 | 15 | 15 |
| Inclination angle θ2 (degree) | 87 | 87 | 87 | 87 | 87 | 87 | 87 |
| Inclination angle θ3 (degree) | 90 | 90 | 90 | 90 | 90 | 90 | 90 |
| Ratio Wb2/Wb1 | 0.70 | 0.70 | 0.70 | 0.70 | 0.70 | 0.70 | 0.70 |
| Ratio Wb3/Wb1 | 0.80 | 0.80 | 0.80 | 0.80 | 0.80 | 0.80 | 0.80 |
| Ratio Wb5/Wb4 | 0.60 | 0.60 | 0.60 | 0.60 | 0.60 | 0.60 | 0.60 |
| Ratio Wb6/Wb4 | 0.55 | 0.55 | 0.55 | 0.55 | 0.55 | 0.55 | 0.55 |
| Tire circumferential lengths of short linear portion and long linear portion (mm) | Greater than 3 mm and less than 15 mm | Greater than 3 mm and less than 15 mm | Greater than 3 mm and less than 15 mm | Greater than 3 mm and less than 15 mm | Greater than 3 mm and less than 15 mm | Greater than 3 mm and less than 15 mm | 15 mm or more and 30 mm or less |
| Ratio W22/W11 | 0.50 | 0.50 | 0.50 | 0.50 | 0.50 | 0.50 | 0.50 |
| Ratio W20/W11 | 0.50 | 0.50 | 0.50 | 0.50 | 0.50 | 0.50 | 0.50 |
| Ratio L/TW | 0.25 | 0.25 | 0.25 | 0.25 | 0.25 | 0.25 | 0.25 |
| Ratio PHDs/PHDc | 0.95 | 0.95 | 0.95 | 0.95 | 0.95 | 0.95 | 0.95 |
| Ratio PHDd/PHDc | 0.8 | 0.8 | 0.8 | 0.8 | 0.8 | 0.8 | 0.8 |
| Ratio SBK2/SBK1 | 0.80 | 0.80 | 0.80 | 0.80 | 0.80 | 0.80 | 0.80 |
| Ratio SBK3/SBK1 | 0.80 | 0.80 | 0.80 | 0.80 | 0.80 | 0.80 | 0.80 |
| Lug groove shape | Linear shape | Linear shape | Linear shape | Linear shape | Linear shape | Linear shape | Linear shape |
| Relationship between outer main grooves | Non-similar shapes | Non-similar shapes | Non-similar shapes | Non-similar shapes | Non-similar shapes | Non-similar shapes | Non-similar shapes |
| Outer opening lug groove | No | No | No | No | No | Yes | Yes |
| Ratio Wrsh/W20 | 1.5 | 1.5 | 1.5 | 1.5 | 1.5 | 1.5 | 1.5 |
| Ratio DS/DR | 0.10 | 0.10 | 0.10 | 0.10 | 0.10 | 0.10 | 0.10 |
| Groove wall angle of main groove (degree) | 5 | 5 | 5 | 5 | 5 | 5 | 5 |
| Bending of groove wall | No | No | No | No | No | No | No |
| Chamfering of block end portions | No | No | No | No | No | No | No |
| Dry performance | 103 | 102 | 103 | 103 | 103 | 103 | 103 |
| Wet performance | 103 | 102 | 103 | 103 | 103 | 103 | 103 |
| Uneven wear resistance performance | 103 | 102 | 104 | 103 | 103 | 105 | 106 |

TABLE 3

| | Example 11 | Example 12 | Example 13 | Example 14 | Example 15 | Example 16 | Example 17 |
|---|---|---|---|---|---|---|---|
| Ratio LC1/PDc | 0.50 | 0.50 | 0.50 | 0.50 | 0.50 | 0.50 | 0.50 |
| Ratio Ls1/PDs | 0.60 | 0.60 | 0.60 | 0.60 | 0.60 | 0.60 | 0.60 |
| Ratio PDs/PDc | 1.00 | 1.00 | 1.00 | 1.00 | 1.00 | 1.00 | 1.00 |
| Intersection position of lug groove | Short linear portion | Short linear portion | Short linear portion | Short linear portion | Short linear portion | Short linear portion | Short linear portion |
| Ratio φ12/PDc | 0.75 | 0.75 | 0.75 | 0.75 | 0.75 | 0.75 | 0.75 |
| Ratio φ13/PDc | 1.05 | 1.05 | 1.05 | 1.05 | 1.05 | 1.05 | 1.05 |
| Size relationship of inclination angles of lug grooves | Large on outer side | Large on outer side | Large on outer side | Large on outer side | Large on outer side | Large on outer side | Large on outer side |
| Inclination angle θ1 (degree) | 15 | 15 | 15 | 15 | 15 | 15 | 15 |
| Inclination angle θ2 (degree) | 87 | 87 | 87 | 87 | 87 | 87 | 87 |
| Inclination angle θ3 (degree) | 90 | 90 | 90 | 90 | 90 | 90 | 90 |
| Ratio Wb2/Wb1 | 0.70 | 0.70 | 0.70 | 0.70 | 0.70 | 0.70 | 0.70 |
| Ratio Wb3/Wb1 | 0.80 | 0.80 | 0.80 | 0.80 | 0.80 | 0.80 | 0.80 |
| Ratio Wb5/Wb4 | 0.60 | 0.60 | 0.60 | 0.60 | 0.60 | 0.60 | 0.60 |
| Ratio Wb6/Wb4 | 0.55 | 0.55 | 0.55 | 0.55 | 0.55 | 0.55 | 0.55 |
| Tire circumferential lengths of short linear portion and long linear portion (mm) | 15 mm or more and 45 mm or less | 20 mm or more and 40 mm or less | Less than 45 mm and 60 mm or less | 20 mm or more and 40 mm or less | 20 mm or more and 40 mm or less | 20 mm or more and 40 mm or less | 20 mm or more and 40 mm or less |
| Ratio W22/W11 | 0.50 | 0.50 | 0.50 | 0.60 | 1.10 | 0.80 | 1.50 |
| Ratio W20/W11 | 0.50 | 0.50 | 0.50 | 0.60 | 1.00 | 1.10 | 1.00 |
| Ratio L/TW | 0.25 | 0.25 | 0.25 | 0.25 | 0.25 | 0.25 | 0.25 |
| Ratio PHDs/PHDc | 0.95 | 0.95 | 0.95 | 0.95 | 0.95 | 0.95 | 0.95 |
| Ratio PHDd/PHDc | 0.8 | 0.8 | 0.8 | 0.8 | 0.8 | 0.8 | 0.8 |
| Ratio SBK2/SBK1 | 0.80 | 0.80 | 0.80 | 0.80 | 0.80 | 0.80 | 0.80 |
| Ratio SBK3/SBK1 | 0.80 | 0.80 | 0.80 | 0.80 | 0.80 | 0.80 | 0.80 |
| Lug groove shape | Linear shape | Linear shape | Linear shape | Linear shape | Linear shape | Linear shape | Linear shape |
| Relationship between outer main grooves | Non-similar shapes | Non-similar shapes | Non-similar shapes | Non-similar shapes | Non-similar shapes | Non-similar shapes | Non-similar shapes |
| Outer opening lug groove | Yes | Yes | Yes | Yes | Yes | Yes | Yes |
| Ratio Wrsh/W20 | 1.5 | 1.5 | 1.5 | 1.5 | 1.5 | 1.5 | 1.5 |
| Ratio DS/DR | 0.10 | 0.10 | 0.10 | 0.10 | 0.10 | 0.10 | 0.10 |
| Groove wall angle of main groove (degree) | 5 | 5 | 5 | 5 | 5 | 5 | 5 |
| Bending of groove wall | No | No | No | No | No | No | No |
| Chamfering of block end portions | No | No | No | No | No | No | No |
| Dry performance | 103 | 103 | 103 | 105 | 105 | 103 | 103 |
| Wet performance | 103 | 103 | 103 | 103 | 105 | 105 | 104 |
| Uneven wear resistance performance | 107 | 106 | 105 | 107 | 107 | 107 | 107 |

TABLE 4

| | Example 18 | Example 19 | Example 20 | Example 21 | Example 22 | Example 23 | Example 24 |
|---|---|---|---|---|---|---|---|
| Ratio LC1/PDc | 0.50 | 0.50 | 0.50 | 0.50 | 0.50 | 0.50 | 0.50 |
| Ratio Ls1/PDs | 0.60 | 0.60 | 0.60 | 0.60 | 0.60 | 0.60 | 0.60 |
| Ratio PDs/PDc | 1.00 | 1.00 | 1.00 | 1.00 | 1.00 | 1.00 | 1.00 |
| Intersection position of lug groove | Short linear portion | Short linear portion | Short linear portion | Short linear portion | Short linear portion | Short linear portion | Short linear portion |
| Ratio φ12/PDc | 0.75 | 0.75 | 0.75 | 0.75 | 0.75 | 0.75 | 0.75 |
| Ratio φ13/PDc | 1.05 | 1.05 | 1.05 | 1.05 | 1.05 | 1.05 | 1.05 |
| Size relationship of inclination angles of lug grooves | Large on outer side | Large on outer side | Large on outer side | Large on outer side | Large on outer side | Large on outer side | Large on outer side |
| Inclination angle θ1 (degree) | 15 | 15 | 15 | 15 | 15 | 15 | 15 |
| Inclination angle θ2 (degree) | 87 | 87 | 87 | 87 | 87 | 87 | 87 |
| Inclination angle θ3 (degree) | 90 | 90 | 90 | 90 | 90 | 90 | 90 |
| Ratio Wb2/Wb1 | 0.70 | 0.70 | 0.70 | 0.70 | 0.70 | 0.70 | 0.70 |
| Ratio Wb3/Wb1 | 0.80 | 0.80 | 0.80 | 0.80 | 0.80 | 0.80 | 0.80 |
| Ratio Wb5/Wb4 | 0.60 | 0.60 | 0.60 | 0.60 | 0.60 | 0.60 | 0.60 |
| Ratio Wb6/Wb4 | 0.55 | 0.55 | 0.55 | 0.55 | 0.55 | 0.55 | 0.55 |
| Tire circumferential lengths of short linear portion and long linear portion (mm) | 20 mm or more and 40 mm or less | 20 mm or more and 40 mm or less | 20 mm or more and 40 mm or less | 20 mm or more and 40 mm or less | 20 mm or more and 40 mm or less | 20 mm or more and 40 mm or less | 20 mm or more and 40 mm or less |
| Ratio W22/W11 | 0.80 | 0.80 | 0.80 | 0.80 | 0.80 | 0.80 | 0.80 |
| Ratio W20/W11 | 1.00 | 1.00 | 1.00 | 1.00 | 1.00 | 1.00 | 1.00 |
| Ratio L/TW | 0.30 | 0.45 | 0.60 | 0.65 | 0.45 | 0.45 | 0.45 |
| Ratio PHDs/PHDc | 0.95 | 0.95 | 0.95 | 0.95 | 0.95 | 0.95 | 0.95 |
| Ratio PHDd/PHDc | 0.8 | 0.8 | 0.8 | 0.8 | 0.8 | 0.8 | 0.8 |
| Ratio SBK2/SBK1 | 0.80 | 0.80 | 0.80 | 0.80 | 0.80 | 0.80 | 0.80 |
| Ratio SBK3/SBK1 | 0.80 | 0.80 | 0.80 | 0.80 | 0.80 | 0.80 | 0.80 |
| Lug groove shape | Linear shape | Linear shape | Linear shape | Linear shape | Linear shape | Linear shape | Linear shape |
| Relationship between outer main grooves | Non-similar shapes | Non-similar shapes | Non-similar shapes | Non-similar shapes | Non-similar shapes | Non-similar shapes | Non-similar shapes |
| Outer opening lug groove | Yes | Yes | Yes | Yes | Yes | Yes | Yes |
| Ratio Wrsh/W20 | 1.5 | 1.5 | 1.5 | 1.5 | 1.5 | 1.5 | 1.5 |
| Ratio DS/DR | 0.10 | 0.10 | 0.10 | 0.10 | 0.10 | 0.10 | 0.10 |
| Groove wall angle of main groove (degree) | 5 | 5 | 5 | 5 | 5 | 5 | 5 |
| Bending of groove wall | No | No | No | No | No | No | No |
| Chamfering of block end portions | No | No | No | No | No | No | No |
| Dry performance | 106 | 107 | 107 | 107 | 108 | 109 | 109 |
| Wet performance | 105 | 105 | 105 | 105 | 105 | 105 | 105 |
| Uneven wear resistance performance | 109 | 109 | 108 | 107 | 111 | 111 | 109 |

TABLE 5

| | Example 25 | Example 26 | Example 27 | Example 28 | Example 29 | Example 30 | Example 31 |
|---|---|---|---|---|---|---|---|
| Ratio LC1/PDc | 0.50 | 0.50 | 0.50 | 0.50 | 0.50 | 0.50 | 0.50 |
| Ratio Ls1/PDs | 0.60 | 0.60 | 0.60 | 0.60 | 0.60 | 0.60 | 0.60 |
| Ratio PDs/PDc | 1.00 | 1.00 | 1.00 | 1.00 | 1.00 | 1.00 | 1.00 |
| Intersection position of lug groove | Short linear portion | Short linear portion | Short linear portion | Short linear portion | Short linear portion | Short linear portion | Short linear portion |
| Ratio φ12/PDc | 0.75 | 0.75 | 0.75 | 0.75 | 0.75 | 0.75 | 0.75 |
| Ratio φ13/PDc | 1.05 | 1.05 | 1.05 | 1.05 | 1.05 | 1.05 | 1.05 |
| Size relationship of inclination angles of lug grooves | Large on outer side | Large on outer side | Large on outer side | Large on outer side | Large on outer side | Large on outer side | Large on outer side |
| Inclination angle θ1 (degree) | 15 | 20 | 45 | 60 | 65 | 45 | 45 |
| Inclination angle θ2 (degree) | 87 | 87 | 87 | 87 | 87 | 85 | 60 |
| Inclination angle θ3 (degree) | 90 | 90 | 90 | 90 | 90 | 85 | 60 |
| Ratio Wb2/Wb1 | 0.70 | 0.70 | 0.70 | 0.70 | 0.70 | 0.70 | 0.70 |
| Ratio Wb3/Wb1 | 0.80 | 0.80 | 0.80 | 0.80 | 0.80 | 0.80 | 0.80 |
| Ratio Wb5/Wb4 | 0.60 | 0.60 | 0.60 | 0.60 | 0.60 | 0.60 | 0.60 |
| Ratio Wb6/Wb4 | 0.55 | 0.55 | 0.55 | 0.55 | 0.55 | 0.55 | 0.55 |
| Tire circumferential lengths of short linear portion and long linear portion (mm) | 20 mm or more and 40 mm or less | 20 mm or more and 40 mm or less | 20 mm or more and 40 mm or less | 20 mm or more and 40 mm or less | 20 mm or more and 40 mm or less | 20 mm or more and 40 mm or less | 20 mm or more and 40 mm or less |
| Ratio W22/W11 | 0.80 | 0.80 | 0.80 | 0.80 | 0.80 | 0.80 | 0.80 |
| Ratio W20/W11 | 1.00 | 1.00 | 1.00 | 1.00 | 1.00 | 1.00 | 1.00 |
| Ratio L/TW | 0.45 | 0.45 | 0.45 | 0.45 | 0.45 | 0.45 | 0.45 |
| Ratio PHDs/PHDc | 0.95 | 0.95 | 0.95 | 0.95 | 0.95 | 0.95 | 0.95 |
| Ratio PHDd/PHDc | 0.8 | 0.8 | 0.8 | 0.8 | 0.8 | 0.8 | 0.8 |
| Ratio SBK2/SBK1 | 0.80 | 0.80 | 0.80 | 0.80 | 0.80 | 0.80 | 0.80 |
| Ratio SBK3/SBK1 | 0.80 | 0.80 | 0.80 | 0.80 | 0.80 | 0.80 | 0.80 |
| Lug groove shape | Linear shape | Linear shape | Linear shape | Linear shape | Linear shape | Linear shape | Linear shape |
| Relationship between outer main grooves | Non-similar shapes | Non-similar shapes | Non-similar shapes | Non-similar shapes | Non-similar shapes | Non-similar shapes | Non-similar shapes |
| Outer opening lug groove | Yes | Yes | Yes | Yes | Yes | Yes | Yes |
| Ratio Wrsh/W20 | 1.5 | 1.5 | 1.5 | 1.5 | 1.5 | 1.5 | 1.5 |
| Ratio DS/DR | 0.10 | 0.10 | 0.10 | 0.10 | 0.10 | 0.10 | 0.10 |
| Groove wall angle of main groove (degree) | 5 | 5 | 5 | 5 | 5 | 5 | 5 |
| Bending of groove wall | No | No | No | No | No | No | No |
| Chamfering of block end portions | No | No | No | No | No | No | No |
| Dry performance | 109 | 111 | 111 | 110 | 109 | 112 | 113 |
| Wet performance | 105 | 105 | 105 | 105 | 105 | 105 | 105 |
| Uneven wear resistance performance | 108 | 112 | 113 | 113 | 113 | 115 | 115 |

TABLE 6

| | Example 32 | Example 33 | Example 34 | Example 35 | Example 36 | Example 37 | Example 38 |
|---|---|---|---|---|---|---|---|
| Ratio LC1/PDc | 0.50 | 0.50 | 0.50 | 0.50 | 0.50 | 0.50 | 0.50 |
| Ratio Ls1/PDs | 0.60 | 0.60 | 0.60 | 0.60 | 0.60 | 0.60 | 0.60 |
| Ratio PDs/PDc | 1.00 | 1.00 | 1.00 | 1.00 | 1.00 | 1.00 | 1.00 |
| intersection position of lug groove | Short linear portion | Short linear portion | Short linear portion | Short linear portion | Short linear portion | Short linear portion | Short linear portion |
| Ratio φ12/PDc | 0.75 | 0.75 | 0.75 | 0.75 | 0.75 | 0.75 | 0.75 |
| Ratio φ13/PDc | 1.05 | 1.05 | 1.05 | 1.05 | 1.05 | 1.05 | 1.05 |
| Size relationship of inclination angles of lug grooves | Large on outer side | Large on outer side | Large on outer side | Large on outer side | Large on outer side | Large on outer side | Large on outer side |
| inclination angle θ1 (degree) | 45 | 45 | 45 | 45 | 45 | 45 | 45 |
| inclination angle θ2 (degree) | 75 | 75 | 75 | 75 | 75 | 75 | 75 |
| inclination angle θ3 (degree) | 75 | 75 | 75 | 75 | 75 | 75 | 75 |
| Ratio Wb2/Wb1 | 0.80 | 1.00 | 0.90 | 0.90 | 0.90 | 0.90 | 0.90 |
| Ratio Wb3/Wb1 | 0.90 | 1.10 | 1.00 | 1.00 | 1.00 | 1.00 | 1.00 |
| Ratio Wb5/Wb4 | 0.60 | 0.60 | 0.60 | 0.75 | 0.85 | 1.00 | 1.00 |
| Ratio Wb6/Wb4 | 0.55 | 0.55 | 0.55 | 0.65 | 0.75 | 0.85 | 1.30 |
| Tire circumferential lengths of short linear portion and long linear portion (mm) | 20 mm or more and 40 mm or less | 20 mm or more and 40 mm or less | 20 mm or more and 40 mm or less | 20 mm or more and 40 mm or less | 20 mm or more and 40 mm or less | 20 mm or more and 40 mm or less | 20 mm or more and 40 mm or less |
| Ratio W22/W11 | 0.80 | 0.80 | 0.80 | 0.80 | 0.80 | 0.80 | 0.80 |
| Ratio W20/W11 | 1.00 | 1.00 | 1.00 | 1.00 | 1.00 | 1.00 | 1.00 |
| Ratio L/TW | 0.45 | 0.45 | 0.45 | 0.45 | 0.45 | 0.45 | 0.45 |
| Ratio PHDs/PHDc | 0.95 | 0.95 | 0.95 | 0.95 | 0.95 | 0.95 | 0.95 |
| Ratio PHDd/PHDc | 0.8 | 0.8 | 0.8 | 0.8 | 0.8 | 0.8 | 0.8 |
| Ratio SBK2/SBK1 | 0.80 | 0.80 | 0.80 | 0.80 | 0.80 | 0.80 | 0.80 |
| Ratio SBK3/SBK1 | 0.80 | 0.80 | 0.80 | 0.80 | 0.80 | 0.80 | 0.80 |
| Lug groove shape | Linear shape | Linear shape | Linear shape | Linear shape | Linear shape | Linear shape | Linear shape |
| Relationship between outer main grooves | Non-similar shapes | Non-similar shapes | Non-similar shapes | Non-similar shapes | Non-similar shapes | Non-similar shapes | Non-similar shapes |
| Outer opening lug groove | Yes | Yes | Yes | Yes | Yes | Yes | Yes |
| Ratio Wrsh/W20 | 1.5 | 1.5 | 1.5 | 1.5 | 1.5 | 1.5 | 1.5 |
| Ratio DS/DR | 0.10 | 0.10 | 0.10 | 0.10 | 0.10 | 0.10 | 0.10 |
| Groove wall angle of main groove (degree) | 5 | 5 | 5 | 5 | 5 | 5 | 5 |
| Bending of groove wall | No | No | No | No | No | No | No |
| Chamfering of block end portions | No | No | No | No | No | No | No |
| Dry performance | 113 | 114 | 113 | 113 | 114 | 113 | 112 |
| Wet performance | 106 | 107 | 106 | 107 | 108 | 107 | 106 |
| Uneven wear resistance performance | 115 | 115 | 115 | 115 | 115 | 115 | 115 |

TABLE 7

| | Example 39 | Example 40 | Example 41 | Example 42 | Example 43 | Example 44 | Example 45 |
|---|---|---|---|---|---|---|---|
| Ratio LC1/PDc | 0.50 | 0.50 | 0.50 | 0.50 | 0.50 | 0.50 | 0.50 |
| Ratio Ls1/PDs | 0.60 | 0.60 | 0.60 | 0.60 | 0.60 | 0.60 | 0.60 |
| Ratio PDs/PDc | 1.00 | 1.00 | 1.00 | 1.00 | 1.00 | 1.00 | 1.00 |
| Intersection position of lug groove | Short linear portion | Short linear portion | Short linear portion | Short linear portion | Short linear portion | Short linear portion | Short linear portion |
| Ratio φ12/PDc | 0.75 | 0.75 | 0.75 | 0.75 | 0.75 | 0.75 | 0.75 |
| Ratio φ13/PDc | 1.05 | 1.05 | 1.05 | 1.05 | 1.05 | 1.05 | 1.05 |
| Size relationship of inclination angles of lug grooves | Large on outer side | Large on outer side | Large on outer side | Large on outer side | Large on outer side | Large on outer side | Large on outer side |
| Inclination angle θ1 (degree) | 45 | 45 | 45 | 45 | 45 | 45 | 45 |
| Inclination angle θ2 (degree) | 75 | 75 | 75 | 75 | 75 | 75 | 75 |
| Inclination angle θ3 (degree) | 75 | 75 | 75 | 75 | 75 | 75 | 75 |
| Ratio Wb2/Wb1 | 0.90 | 0.90 | 0.90 | 0.90 | 0.90 | 0.90 | 0.90 |
| Ratio Wb3/Wb1 | 1.00 | 1.00 | 1.00 | 1.00 | 1.00 | 1.00 | 1.00 |
| Ratio Wb5/Wb4 | 0.85 | 0.85 | 0.85 | 0.85 | 0.85 | 0.85 | 0.85 |
| Ratio Wb6/Wb4 | 0.75 | 0.75 | 0.75 | 0.75 | 0.75 | 0.75 | 0.75 |
| Tire circumferential lengths of short linear portion and long linear portion (mm) | 20 mm or more and 40 mm or less | 20 mm or more and 40 mm or less | 20 mm or more and 40 mm or less | 20 mm or more and 40 mm or less | 20 mm or more and 40 mm or less | 20 mm or more and 40 mm or less | 20 mm or more and 40 mm or less |
| Ratio W22/W11 | 0.80 | 0.80 | 0.80 | 0.80 | 0.80 | 0.80 | 0.80 |
| Ratio W20/W11 | 1.00 | 1.00 | 1.00 | 1.00 | 1.00 | 1.00 | 1.00 |
| Ratio L/TW | 0.45 | 0.45 | 0.45 | 0.45 | 0.45 | 0.45 | 0.45 |
| Ratio PHDs/PHDc | 1.15 | 1.5 | 1.3 | 1.3 | 1.3 | 1.3 | 1.3 |
| Ratio PHDd/PHDc | 0.8 | 0.8 | 0.9 | 1.2 | 1.05 | 1.05 | 1.05 |
| Ratio SBK2/SBK1 | 0.80 | 0.80 | 0.80 | 0.80 | 0.80 | 0.80 | 0.80 |
| Ratio SBK3/SBK1 | 0.80 | 0.80 | 0.80 | 0.80 | 0.80 | 0.80 | 0.80 |
| Lug groove shape | Linear shape | Linear shape | Linear shape | Linear shape | Linear shape | Linear shape | Linear shape |
| Relationship between outer main grooves | Non-similar shapes | Non-similar shapes | Non-similar shapes | Non-similar shapes | Non-similar shapes | Non-similar shapes | Non-similar shapes |
| Outer opening lug groove | Yes | Yes | Yes | Yes | Yes | Yes | Yes |
| Ratio Wrsh/W20 | 1.5 | 1.5 | 1.5 | 1.5 | 1.5 | 1.5 | 1.5 |
| Ratio DS/DR | 0.10 | 0.10 | 0.10 | 0.10 | 0.10 | 0.10 | 0.10 |
| Groove wall angle of main groove (degree) | 5 | 5 | 5 | 5 | 5 | 5 | 5 |
| Bending of groove wall | No | No | No | No | No | No | No |
| Chamfering of block end portions | No | No | No | No | No | No | No |
| Dry performance | 114 | 114 | 114 | 114 | 113 | 113 | 114 |
| Wet performance | 107 | 107 | 107 | 107 | 105 | 105 | 107 |
| Uneven wear resistance performance | 115 | 115 | 115 | 115 | 114 | 113 | 115 |

TABLE 8

| | Example 46 | Example 47 | Example 48 | Example 49 | Example 50 | Example 51 | Example 52 |
|---|---|---|---|---|---|---|---|
| Ratio LC1/PDc | 0.50 | 0.50 | 0.50 | 0.50 | 0.50 | 0.50 | 0.50 |
| Ratio Ls1/PDs | 0.60 | 0.60 | 0.60 | 0.60 | 0.60 | 0.60 | 0.60 |
| Ratio PDs/PDc | 1.00 | 1.00 | 1.00 | 1.00 | 1.00 | 1.00 | 1.00 |
| Intersection position of lug groove | Short linear portion | Short linear portion | Short linear portion | Short linear portion | Short linear portion | Short linear portion | Short linear portion |
| Ratio φ12/PDc | 0.75 | 0.75 | 0.75 | 0.75 | 0.75 | 0.75 | 0.75 |
| Ratio φ13/PDc | 1.05 | 1.05 | 1.05 | 1.05 | 1.05 | 1.05 | 1.05 |
| Size relationship of inclination angles of lug grooves | Large on outer side | Large on outer side | Large on outer side | Large on outer side | Large on outer side | Large on outer side | Large on outer side |
| Inclination angle θ1 (degree) | 45 | 45 | 45 | 45 | 45 | 45 | 45 |
| Inclination angle θ2 (degree) | 75 | 75 | 75 | 75 | 75 | 75 | 75 |
| Inclination angle θ3 (degree) | 75 | 75 | 75 | 75 | 75 | 75 | 75 |
| Ratio Wb2/Wb1 | 0.90 | 0.90 | 0.90 | 0.90 | 0.90 | 0.90 | 0.90 |
| Ratio Wb3/Wb1 | 1.00 | 1.00 | 1.00 | 1.00 | 1.00 | 1.00 | 1.00 |
| Ratio Wb5/Wb4 | 0.85 | 0.85 | 0.85 | 0.85 | 0.85 | 0.85 | 0.85 |
| Ratio Wb6/Wb4 | 0.75 | 0.75 | 0.75 | 0.75 | 0.75 | 0.75 | 0.75 |
| Tire circumferential lengths of short linear portion and long linear portion (mm) | 20 mm or more and 40 mm or less | 20 mm or more and 40 mm or less | 20 mm or more and 40 mm or less | 20 mm or more and 40 mm or less | 20 mm or more and 40 mm or less | 20 mm or more and 40 mm or less | 20 mm or more and 40 mm or less |
| Ratio W22/W11 | 0.80 | 0.80 | 0.80 | 0.80 | 0.80 | 0.80 | 0.80 |
| Ratio W20/W11 | 1.00 | 1.00 | 1.00 | 1.00 | 1.00 | 1.00 | 1.00 |
| Ratio L/TW | 0.45 | 0.45 | 0.45 | 0.45 | 0.45 | 0.45 | 0.45 |
| Ratio PHDs/PHDc | 1.3 | 1.3 | 1.3 | 1.3 | 1.3 | 1.3 | 1.3 |
| Ratio PHDd/PHDc | 1.05 | 1.05 | 1.05 | 1.05 | 1.05 | 1.05 | 1.05 |
| Ratio SBK2/SBK1 | 0.80 | 0.80 | 0.80 | 0.85 | 0.95 | 0.95 | 0.95 |
| Ratio SBK3/SBK1 | 0.80 | 0.80 | 0.80 | 0.85 | 0.95 | 0.95 | 0.95 |
| Lug groove shape | Linear shape | Linear shape | Linear shape | Linear shape | Linear shape | Linear shape | Linear shape |
| Relationship between outer main grooves | Non-similar shapes | Non-similar shapes | Non-similar shapes | Non-similar shapes | Non-similar shapes | Non-similar shapes | Non-similar shapes |
| Outer opening lug groove | Yes | Yes | Yes | Yes | Yes | Yes | Yes |
| Ratio Wrsh/W20 | 1.5 | 1.5 | 1.5 | 1.5 | 2.0 | 2.5 | 3.0 |
| Ratio DS/DR | 0.10 | 0.10 | 0.10 | 0.10 | 0.10 | 0.10 | 0.10 |
| Groove wall angle of main groove (degree) | 5 | 5 | 5 | 5 | 5 | 5 | 5 |
| Bending of groove wall | No | No | No | No | No | No | No |
| Chamfering of block end portions | No | No | No | No | No | No | No |
| Dry performance | 115 | 115 | 113 | 116 | 116 | 117 | 117 |
| Wet performance | 107 | 106 | 105 | 107 | 107 | 107 | 107 |
| Uneven wear resistance performance | 115 | 115 | 115 | 115 | 117 | 117 | 116 |

TABLE 9

| | Example 53 | Example 54 | Example 55 | Example 56 | Example 57 | Example 58 | Example 59 |
|---|---|---|---|---|---|---|---|
| Ratio LC1/PDc | 0.50 | 0.50 | 0.50 | 0.50 | 0.50 | 0.50 | 0.50 |
| Ratio Ls1/PDs | 0.60 | 0.60 | 0.60 | 0.60 | 0.60 | 0.60 | 0.60 |
| Ratio PDs/PDc | 1.00 | 1.00 | 1.00 | 1.00 | 1.00 | 1.00 | 1.00 |
| Intersection position of lug groove | Short linear portion | Short linear portion | Short linear portion | Short linear portion | Short linear portion | Short linear portion | Short linear portion |
| Ratio φ12/PDc | 0.75 | 0.75 | 0.75 | 0.75 | 0.75 | 0.75 | 0.75 |
| Ratio φ13/PDc | 1.05 | 1.05 | 1.05 | 1.05 | 1.05 | 1.05 | 1.05 |
| Size relationship of inclination angles of lug grooves | Large on outer side | Large on outer side | Large on outer side | Large on outer side | Large on outer side | Large on outer side | Large on outer side |
| Inclination angle θ1 (degree) | 45 | 45 | 45 | 45 | 45 | 45 | 45 |
| Inclination angle θ2 (degree) | 75 | 75 | 75 | 75 | 75 | 75 | 75 |
| Inclination angle θ3 (degree) | 75 | 75 | 75 | 75 | 75 | 75 | 75 |
| Ratio Wb2/Wb1 | 0.90 | 0.90 | 0.90 | 0.90 | 0.90 | 0.90 | 0.90 |
| Ratio Wb3/Wb1 | 1.00 | 1.00 | 1.00 | 1.00 | 1.00 | 1.00 | 1.00 |
| Ratio Wb5/Wb4 | 0.85 | 0.85 | 0.85 | 0.85 | 0.85 | 0.85 | 0.85 |
| Ratio Wb6/Wb4 | 0.75 | 0.75 | 0.75 | 0.75 | 0.75 | 0.75 | 0.75 |
| Tire circumferential lengths of short linear portion and long linear portion (mm) | 20 mm or more and 40 mm or less | 20 mm or more and 40 mm or less | 20 mm or more and 40 mm or less | 20 mm or more and 40 mm or less | 20 mm or more and 40 mm or less | 20 mm or more and 40 mm or less | 20 mm or more and 40 mm or less |
| Ratio W22/W11 | 0.80 | 0.80 | 0.80 | 0.80 | 0.80 | 0.80 | 0.80 |
| Ratio W20/W11 | 1.00 | 1.00 | 1.00 | 1.00 | 1.00 | 1.00 | 1.00 |
| Ratio L/TW | 0.45 | 0.45 | 0.45 | 0.45 | 0.45 | 0.45 | 0.45 |
| Ratio PHDs/PHDc | 1.3 | 1.3 | 1.3 | 1.3 | 1.3 | 1.3 | 1.3 |
| Ratio PHDd/PHDc | 1.05 | 1.05 | 1.05 | 1.05 | 1.05 | 1.05 | 1.05 |
| Ratio SBK2/SBK1 | 0.95 | 0.95 | 0.95 | 0.95 | 0.95 | 0.95 | 0.95 |
| Ratio SBK3/SBK1 | 0.95 | 0.95 | 0.95 | 0.95 | 0.95 | 0.95 | 0.95 |
| Lug groove shape | Linear shape | S-shape | S-shape | S-shape | S-shape | S-shape | S-shape |
| Relationship between outer main grooves | Non-similar shapes | Non-similar shapes | Non-similar shapes | Non-similar shapes | Non-similar shapes | Non-similar shapes | Non-similar shapes |
| Outer opening lug groove | Yes | Yes | Yes | Yes | Yes | Yes | Yes |
| Ratio Wrsh/W20 | 3.5 | 2.5 | 2.5 | 2.5 | 2.5 | 2.5 | 2.5 |
| Ratio DS/DR | 0.10 | 0.10 | 0.15 | 0.25 | 0.35 | 0.45 | 0.25 |
| Groove wall angle of main groove (degree) | 5 | 5 | 5 | 5 | 5 | 5 | 10 |
| Bending of groove wall | No | No | No | No | No | No | No |
| Chamfering of block end portions | No | No | No | No | No | No | No |
| Dry performance | 115 | 118 | 118 | 118 | 118 | 118 | 119 |
| Wet performance | 107 | 108 | 109 | 110 | 110 | 109 | 112 |
| Uneven wear resistance performance | 115 | 118 | 120 | 120 | 119 | 118 | 120 |

TABLE 10

| | Example 60 | Example 61 | Example 62 | Example 63 | Example 64 | Example 65 |
|---|---|---|---|---|---|---|
| Ratio LC1/PDc | 0.50 | 0.50 | 0.50 | 0.50 | 0.50 | 0.50 |
| Ratio Ls1/PDs | 0.60 | 0.60 | 0.60 | 0.60 | 0.60 | 0.60 |
| Ratio PDs/PDc | 1.00 | 1.00 | 1.00 | 1.00 | 1.00 | 1.00 |
| Intersection position of lug groove | Short linear portion | Short linear portion | Short linear portion | Short linear portion | Short linear portion | Short linear portion |
| Ratio φ12/PDc | 0.75 | 0.75 | 0.75 | 0.75 | 0.75 | 0.75 |
| Ratio φ13/PDc | 1.05 | 1.05 | 1.05 | 1.05 | 1.05 | 1.05 |
| Size relationship of inclination angles of lug grooves | Large on outer side | Large on outer side | Large on outer side | Large on outer side | Large on outer side | Large on outer side |
| Inclination angle θ1 (degree) | 45 | 45 | 45 | 45 | 45 | 45 |
| Inclination angle θ2 (degree) | 75 | 75 | 75 | 75 | 75 | 75 |
| Inclination angle θ3 (degree) | 75 | 75 | 75 | 75 | 75 | 75 |
| Ratio Wb2/Wb1 | 0.90 | 0.90 | 0.90 | 0.90 | 0.90 | 0.90 |
| Ratio Wb3/Wb1 | 1.00 | 1.00 | 1.00 | 1.00 | 1.00 | 1.00 |
| Ratio Wb5/Wb4 | 0.85 | 0.85 | 0.85 | 0.85 | 0.85 | 0.85 |
| Ratio Wb6/Wb4 | 0.75 | 0.75 | 0.75 | 0.75 | 0.75 | 0.75 |
| Tire circumferential lengths of short linear portion and long linear portion (mm) | 20 mm or more and 40 mm or less | 20 mm or more and 40 mm or less | 20 mm or more and 40 mm or less | 20 mm or more and 40 mm or less | 20 mm or more and 40 mm or less | 20 mm or more and 40 mm or less |
| Ratio W22/W11 | 0.80 | 0.80 | 0.80 | 0.80 | 0.80 | 0.80 |
| Ratio W20/W11 | 1.00 | 1.00 | 1.00 | 1.00 | 1.00 | 1.00 |
| Ratio L/TW | 0.45 | 0.45 | 0.45 | 0.45 | 0.45 | 0.45 |
| Ratio PHDs/PHDc | 1.3 | 1.3 | 1.3 | 1.3 | 1.3 | 1.3 |
| Ratio PHDd/PHDc | 1.05 | 1.05 | 1.05 | 1.05 | 1.05 | 1.05 |
| Ratio SBK2/SBK1 | 0.95 | 0.95 | 0.95 | 0.95 | 0.95 | 0.95 |
| Ratio SBK3/SBK1 | 0.95 | 0.95 | 0.95 | 0.95 | 0.95 | 0.95 |
| Lug groove shape | S-shape | S-shape | S-shape | S-shape | S-shape | S-shape |
| Relationship between outer main grooves | Non-similar shapes | Non-similar shapes | Non-similar shapes | Non-similar shapes | Non-similar shapes | Similar shapes |
| Outer opening lug groove | Yes | Yes | Yes | Yes | Yes | Yes |
| Ratio Wrsh/W20 | 2.5 | 2.5 | 2.5 | 2.5 | 2.5 | 2.5 |
| Ratio DS/DR | 0.25 | 0.25 | 0.25 | 0.25 | 0.25 | 0.25 |
| Groove wall angle of main groove (degree) | 15 | 35 | 45 | 15 | 15 | 15 |
| Bending of groove wall | No | No | No | Yes | Yes | Yes |
| Chamfering of block end portions | No | No | No | No | Yes | Yes |
| Dry performance | 120 | 120 | 118 | 121 | 122 | 123 |
| Wet performance | 112 | 111 | 110 | 112 | 112 | 113 |
| Uneven wear resistance performance | 120 | 120 | 120 | 121 | 122 | 123 |

The invention claimed is:

1. A tire, comprising:

a tread portion comprising a center main groove, an outer main groove, and a lug groove, the center main groove being provided at a position closest to a tire equatorial plane and extending in a tire circumferential direction without crossing the tire equatorial plane, the outer main groove being provided on an outer side in a tire width direction of the center main groove and extending in the tire circumferential direction without crossing the tire equatorial plane, the lug groove extending in a direction intersecting with the center main groove and the outer main groove;

the lug groove extends across multiple land portions and an extension line of the lug groove in one of the land portions smoothly connects with an extension line of the lug groove in an other one of the land portions;

the center main groove having a zigzag shape in which a first linear portion and a second linear portion having mutually different inclination angles in the tire width direction with respect to the tire circumferential direction are alternately connected;

the first linear portion and the second linear portion incline relative to the tire circumferential direction;

the outer main groove having a zigzag shape in which a long linear portion and a short linear portion having mutually different inclination angles in the tire width direction with respect to the tire circumferential direction and having different tire circumferential direction lengths are alternately connected, the long linear portion and the short linear portion being provided a bending point of the zigzag shape as a boundary therebetween;

an extension line as an extension of a groove center line of the lug groove intersecting with the short linear portion in the zigzag shape of the outer main groove;

a ratio of a tire circumferential length of the first linear portion to a tire circumferential length of one period of the zigzag shape of the center main groove being 0.40 or more and 0.60 or less;

a ratio of the tire circumferential length of the long linear portion to a tire circumferential length of one period of the zigzag shape of the outer main groove being 0.45 or more and 0.75 or less;

a ratio of the tire circumferential length of the one period of the zigzag shape of the outer main groove to the tire circumferential length of the one period of the zigzag shape of the center main groove being 0.90 or more and 1.20 or less;

a step portion being provided between groove opening end portions of the center main groove to a tread surface and a groove bottom;

both of groove walls in the tire width direction of the center main groove radially inward of the step portion each having the zigzag shape in the tire circumferential direction; and both of groove walls in the tire width direction of the center main groove radially outward of the step portion each having the zigzag shape in the tire circumferential direction; wherein all of the short linear portions intersect the lug groove or an other lug groove and all of the long linear portions do not intersect any lug grooves.

2. The tire according to claim 1, wherein the period of the zigzag shape of the outer main groove has a phase difference with the period of the zigzag shape of the center main groove, and when the center main groove is adjacent to the outer main groove in the tire width direction, a ratio of a tire circumferential length corresponding to the phase difference to the tire circumferential length of the one period of the zigzag shape of the center main groove is 0.60 or more and 0.85 or less.

3. The tire according to claim 1, comprising a plurality of the outer main grooves, wherein a ratio of a tire circumferential length corresponding to a phase difference between the period of the zigzag shape of the outer main groove on the outer side in the tire width direction among the plurality of outer main grooves and the period of the zigzag shape of the center main groove to the tire circumferential length of the one period of the zigzag shape of the center main groove is 0.95 or more and 1.15 or less.

4. The tire according to claim 1, comprising a plurality of the lug grooves and a plurality of the outer main grooves, wherein each of the plurality of lug grooves extends from the tire equatorial plane to each of the plurality of outer main grooves, a plurality of center blocks are defined by the plurality of lug grooves and a plurality of the center main grooves, a plurality of outer blocks are defined by the plurality of lug grooves and the plurality of outer main grooves, and each of the plurality of lug grooves between the plurality of outer blocks adjacent in the tire circumferential direction has an inclination angle with respect to the tire circumferential direction greater than an inclination angle of each of the plurality of lug grooves between the plurality of center blocks adjacent in the tire circumferential direction with respect to the tire circumferential direction.

5. The tire according to claim 4, wherein the inclination angle of each of the plurality of lug grooves between the plurality of center blocks adjacent in the tire circumferential direction with respect to the tire circumferential direction is 20 degrees or more and 60 degrees or less.

6. The tire according to claim 4, wherein the inclination angle of each of the plurality of lug grooves between the plurality of outer blocks adjacent in the tire circumferential direction with respect to the tire circumferential direction is 60 degrees or more and 89 degrees or less.

7. The tire according to claim 4, wherein when each of the plurality of outer blocks includes a first outer block adjacent to each of the plurality of center blocks on the outer side in the tire width direction, a ratio of a tire width direction length of the first outer block to a tire width direction length of each of the plurality of center blocks is 0.80 or more and 1.00 or less, and when each of the plurality of outer blocks includes a second outer block located on the outer side in the tire width direction of the first outer block, a ratio of a tire width direction length of the second outer block to the tire width direction length of each of the plurality of center blocks is 0.90 or more and 1.10 or less.

8. The tire according to claim 1, comprising a plurality of the lug grooves and a plurality of the outer main grooves, wherein each of the plurality of lug grooves extends from the tire equatorial plane to each of the plurality of outer main grooves, a plurality of center blocks are defined by the plurality of lug grooves and a plurality of the center main grooves, a first outer block and a second outer block on the outer side in the tire width direction of the first outer block are defined by the plurality of lug grooves and the plurality of outer main grooves, a ratio of a tire circumferential length of the first outer block to a tire circumferential length of each of the plurality of center blocks is 0.75 or more and 1.00 or less, and a ratio of a tire circumferential length of the second outer block to the tire circumferential length of each of the plurality of center blocks is 0.65 or more and 0.85 or less.

9. The tire according to claim 1, wherein the tire circumferential length of the long linear portion in the zigzag shape of the outer main groove is longer than the tire circumferential length of the first linear portion, the tire circumferential length of the long linear portion in the zigzag shape of the outer main groove is longer than the tire circumferential length of the second linear portion, the tire circumferential length of the short linear portion in the zigzag shape of the outer main groove is shorter than the tire circumferential length of the first linear portion, the tire circumferential length of the short linear portion in the zigzag shape of the outer main groove is shorter than the tire circumferential length of the second linear portion, the tire circumferential length of the short linear portion is 15 mm or more, and the tire circumferential length of the long linear portion is 45 mm or less.

10. The tire according to claim 1, wherein a ratio of a distance in the tire circumferential direction between a plurality of outer blocks adjacent in the tire circumferential direction across the lug groove to a distance in the tire circumferential direction between a plurality of center blocks adjacent in the tire circumferential direction across the lug groove is 0.60 or more and 1.10 or less.

11. The tire according to claim 1, wherein
each of a plurality of the lug grooves extends from the tire equatorial plane to a plurality of the outer main grooves on both sides in the tire width direction across the tire equatorial plane, and
a ratio of a tire circumferential length between an opening position of each of the plurality of lug grooves to each of the plurality of outer main grooves on one side across the tire equatorial plane and an opening position of each of the plurality of lug grooves to each of the plurality of outer main grooves on the other side across the tire equatorial plane to a width of the tread portion is 0.30 or more and 0.60 or less.

12. The tire according to claim 1, wherein a ratio of an amplitude of the zigzag shape of each of the outer main grooves in the tire width direction to an amplitude of the zigzag shape of the center main groove in the tire width direction is 1.15 or more and 1.50 or less.

13. The tire according to claim 1, comprising
a plurality of the lug grooves and a plurality of the outer main grooves, wherein a ratio of an area of a road contact surface of each of a plurality of outer blocks defined by the plurality of lug grooves and the plurality of outer main grooves to an area of a road contact surface of each of a plurality of center blocks defined by the plurality of lug grooves and a plurality of the center main grooves is 0.85 or more and 1.05 or less.

14. The tire according to claim 1, wherein
each of a plurality of the lug grooves extends from the tire equatorial plane to a plurality of the outer main grooves on both sides in the tire width direction across the tire equatorial plane,
an inflection point is provided between each of the plurality of outer main grooves on one side with respect to the tire equatorial plane and each of the plurality of outer main grooves on the other side with respect to the tire equatorial plane, and
a direction of a curvature of each of the plurality of the lug grooves in the tire circumferential direction from each of the plurality of outer main grooves on the one side to the inflection point and a direction of a curvature in the tire circumferential direction from each of the plurality of outer main grooves on the other side to the inflection point are opposite.

15. The tire according to claim 1, comprising
a plurality of the outer main grooves, the plurality of outer main grooves having shapes similar to one another.

16. The tire according to claim 1, wherein the step portion is provided continuously in the tire circumferential direction.

17. The tire according to claim 1, wherein the step portion is continuously provided between intersection positions of the center main groove and the lug groove in the tire circumferential direction.

18. The tire according to claim 1, wherein a step portion is provided between the groove opening end portion on the tread surface of the outer main groove and the groove bottom of the outer main groove.

19. The tire according to claim 1, wherein
the lug groove and the other lug groove are comprised among a plurality of lug grooves,
the outer main groove comprises a plurality of the outer main grooves,
each lug groove of the plurality of lug grooves extends respectively from the tire equatorial plane to each of the plurality of outer main grooves,
a plurality of the center blocks are defined by the plurality of lug grooves and the center main groove, and
a plurality of outer blocks are defined by the plurality of lug grooves and the plurality of the outer main grooves.

20. A tire, comprising:
a tread portion comprising a center main groove, an outer main groove, and a lug groove, the center main groove being provided at a position closest to a tire equatorial plane and extending in a tire circumferential direction without crossing the tire equatorial plane, the outer main groove being provided on an outer side in a tire width direction of the center main groove and extending in the tire circumferential direction without crossing the tire equatorial plane, the lug groove extending in a direction intersecting with the center main groove and the outer main groove;
the lug groove inclines toward one side in the tire circumferential direction and does not incline toward an other side in the tire circumferential direction;
the center main groove having a zigzag shape in which a first linear portion and a second linear portion having mutually different inclination angles in the tire width direction with respect to the tire circumferential direction are alternately connected;
the first linear portion and the second linear portion incline relative to the tire circumferential direction;
the outer main groove having a zigzag shape in which a long linear portion and a short linear portion having mutually different inclination angles in the tire width direction with respect to the tire circumferential direction and having different tire circumferential direction lengths are alternately connected, the long linear portion and the short linear portion being provided with a bending point of the zigzag shape as a boundary therebetween;
an extension line as an extension of a groove center line of the lug groove intersecting with the short linear portion in the zigzag shape of the outer main groove;
a ratio of a tire circumferential length of the first linear portion to a tire circumferential length of one period of the zigzag shape of the center main groove being 0.40 or more and 0.60 or less;
a ratio of the tire circumferential length of the long linear portion to a tire circumferential length of one period of the zigzag shape of the outer main groove being 0.45 or more and 0.75 or less;
a ratio of the tire circumferential length of the one period of the zigzag shape of the outer main groove to the tire circumferential length of the one period of the zigzag shape of the center main groove being 0.90 or more and 1.20 or less;
the outer main groove including an outer main groove on one side of the tread portion in the tire width direction and an outer main groove on an other side of the tread portion in the tire width direction;
the lug groove continuously extends from the outer main groove on the one side of the tread portion in the tire width direction to the outer main groove on the other side of the tread portion in the tire width direction across the tire equatorial plane;
a step portion being provided between groove opening end portions of the center main groove to a tread surface and a groove bottom;
both of groove walls in the tire width direction of the center main groove radially inward of the step portion each having the zigzag shape in the tire circumferential direction; and both of groove walls in the tire width direction of the center main groove radially outward of the step portion each having the zigzag shape in the tire circumferential direction; wherein all of the short linear portions intersect the lug groove or an other lug groove and all of the long linear portions do not intersect any lug grooves.

21. The tire according to claim 20, wherein the step portion is provided continuously in the tire circumferential direction.

22. The tire according to claim 20, wherein the step portion is continuously provided between intersection positions of the center main groove and the lug groove in the tire circumferential direction.

23. The tire according to claim 20, wherein a step portion is provided between the groove opening end portion on the tread surface of the outer main groove and the groove bottom of the outer main groove.

24. The tire according to claim 20, wherein the lug groove and the other lug groove are comprised among a plurality of lug grooves, the outer main groove comprises a plurality of the outer main grooves, each lug groove of the plurality of lug grooves extends respectively from the tire equatorial plane to each of the plurality of outer main grooves, a plurality of the center blocks are defined by the plurality of lug grooves and the center main groove, and a plurality of outer blocks are defined by the plurality of lug grooves and the plurality of the outer main grooves.

25. A tire, comprising:

a tread portion comprising a center main groove, an outer main groove, and a lug groove, the center main groove being provided at a position closest to a tire equatorial plane and extending in a tire circumferential direction without crossing the tire equatorial plane, the outer main groove being provided on an outer side in a tire width direction of the center main groove and extending in the tire circumferential direction without crossing the tire equatorial plane, the lug groove extending in a direction intersecting with the center main groove and the outer main groove;

the center main groove having a zigzag shape in which a first linear portion and a second linear portion having mutually different inclination angles in the tire width direction with respect to the tire circumferential direction are alternately connected;

the first linear portion and the second linear portion incline relative to the tire circumferential direction;

the outer main groove having a zigzag shape in which a long linear portion and a short linear portion having mutually different inclination angles in the tire width direction with respect to the tire circumferential direction and having different tire circumferential direction lengths are alternately connected, the long linear portion and the short linear portion being provided with a bending point of the zigzag shape as a boundary therebetween;

an extension line as an extension of a groove center line of the lug groove intersecting with the short linear portion in the zigzag shape of the outer main groove;

a ratio of a tire circumferential length of the first linear portion to a tire circumferential length of one period of the zigzag shape of the center main groove being 0.40 or more and 0.60 or less;

a ratio of the tire circumferential length of the long linear portion to a tire circumferential length of one period of the zigzag shape of the outer main groove being 0.45 or more and 0.75 or less;

a ratio of the tire circumferential length of the one period of the zigzag shape of the outer main groove to the tire circumferential length of the one period of the zigzag shape of the center main groove being 0.90 or more and 1.20 or less;

wherein the outer main groove includes an outer main groove on one side of the tire equatorial plane and an outer main groove on an other side of the tire equatorial plane;

each of a plurality of the lug grooves extends from the outer main groove on the one side of the tire equatorial plane to the outer main groove on the other side of the tire equatorial plane, crossing the tire equatorial plane;

a ratio of a tire circumferential length between an opening position of each of the plurality of lug grooves to the outer main groove on the one side of the tire equatorial plane and an opening position of each of the plurality of lug grooves to the outer main groove on the other side of the tire equatorial plane to a width of the tread portion is 0.40 or more and 0.60 or less;

a step portion being provided between groove opening end portions of the center main groove to a tread surface and a groove bottom;

both of groove walls in the tire width direction of the center main groove radially inward of the step portion each having the zigzag shape in the tire circumferential direction; and both of groove walls in the tire width direction of the center main groove radially outward of the step portion each having the zigzag shape in the tire circumferential direction; wherein all of the short linear portions intersect the lug groove or an other lug groove and all of the long linear portions do not intersect any lug grooves.

26. The tire according to claim 25, wherein the step portion is provided continuously in the tire circumferential direction.

27. The tire according to claim 25, wherein the step portion is continuously provided between intersection positions of the center main groove and the lug groove in the tire circumferential direction.

28. The tire according to claim 25, wherein a step portion is provided between the groove opening end portion on the tread surface of the outer main groove and the groove bottom of the outer main groove.

29. The tire according to claim 25, wherein the lug groove and the other lug groove are comprised among a plurality of lug grooves, the outer main groove comprises a plurality of the outer main grooves, each lug groove of the plurality of lug grooves extends respectively from the tire equatorial plane to each of the plurality of outer main grooves, a plurality of the center blocks are defined by the plurality of lug grooves and the center main groove, and a plurality of outer blocks are defined by the plurality of lug grooves and the plurality of the outer main grooves.

* * * * *